US006193422B1

(12) United States Patent
Belt et al.

(10) Patent No.: US 6,193,422 B1
(45) Date of Patent: *Feb. 27, 2001

(54) IMPLEMENTATION OF IDLE MODE IN A SUSPEND/RESUME MICROPROCESSOR SYSTEM

(75) Inventors: Steven L. Belt, Stevensville; Robert J. Grabon, Oronoko Township, Berrien County; Chandrakant H. Pandya; Jiming Sun, both of St. Joseph; Neysa K. Terry-Gray, Lake Township, Berrien County; Min E. Lee, Lincoln Township, Berrien County; Norman M. Hack, St. Joseph, all of MI (US)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/264,182

(22) Filed: Jun. 22, 1994

Related U.S. Application Data

(63) Continuation of application No. 07/942,120, filed on Sep. 8, 1992, now abandoned, which is a continuation-in-part of application No. 07/866,787, filed on Apr. 3, 1992, now abandoned.

(51) Int. Cl.⁷ .................................................. G06F 13/10
(52) U.S. Cl. ........................... 395/750; 395/838; 395/750
(58) Field of Search ................................... 395/835, 838, 395/750, 733, 734

(56) References Cited

U.S. PATENT DOCUMENTS

| | | |
|---|---|---|
| 4,294,496 | 10/1981 | Murez . |
| 4,317,180 | 2/1982 | Lies . |
| 4,381,552 | 4/1983 | Nocilini et al. . |
| 4,458,307 | 7/1984 | McAnlis et al. . |
| 4,461,003 | 7/1984 | Tamaki . |
| 4,506,323 | 3/1985 | Pusic et al. . |
| 4,523,295 | 6/1985 | Zato . |
| 4,564,751 | 1/1986 | Alley et al. . |
| 4,626,986 | 12/1986 | Mori . |
| 4,646,307 | 2/1987 | Nishimura . |
| 4,658,352 | 4/1987 | Nagasawa . |
| 4,674,089 | 6/1987 | Poret et al. . |
| 4,689,761 | 8/1987 | Yurchenco . |
| 4,694,393 | 9/1987 | Hirano et al. . |
| 4,698,748 | 10/1987 | Juzswik et al. . |
| 4,734,851 | 3/1988 | Director . |

(List continued on next page.)

OTHER PUBLICATIONS

Microsoft, MS–DOS, User's Guide, 1986, Title Pages and p. 245.
IBM System/360 Principles of Operation, Eighth Edition (Sep., 1968) Title Pages and pp. 68–83.
Toshiba T1600 "User's Manual" 2d ed.; Title page, pp. 2–1 to 2–3, and pp. 2–8 to 2–11; 1987.
Clements, Alan; "Microprocessor Systems Design", 1987, Title pages and p. 117, 246, 247, 353, 354, PWS–Kent Publishing Company, Boston.

*Primary Examiner*—Kevin A. Kriess
*Assistant Examiner*—Kakali Chaki
(74) *Attorney, Agent, or Firm*—Katten Muchin Zavis

(57) ABSTRACT

A portable computer system includes an input device such as a keyboard, a display, and a processor which is operable in a normal operational mode and in a reduced power mode, the processor carrying out program execution in each of the normal operational mode and reduced power mode. A timing arrangement switches the processor from its normal operational mode to its reduced power mode in response to the absence of any of a plurality of predetermined events during a predetermined time interval, the predetermined events including actuation of keys on the keyboard and transmission of information to the video display.

36 Claims, 8 Drawing Sheets

U.S. PATENT DOCUMENTS

| | | |
|---|---|---|
| 4,757,505 | 7/1988 | Marrington et al. . |
| 4,763,333 | 8/1988 | Byrd . |
| 4,782,468 | 11/1988 | Jones et al. . |
| 4,823,292 | 4/1989 | Hillion . |
| 4,839,837 | 6/1989 | Chang . |
| 4,868,832 | 9/1989 | Marrington et al. . |
| 4,870,570 | 9/1989 | Satoh et al. . |
| 4,907,150 | 3/1990 | Arroyo et al. . |
| 4,933,785 | 6/1990 | Morehouse et al. . |
| 4,945,335 | 7/1990 | Kimura et al. . |
| 4,980,836 | 12/1990 | Carter et al. . |
| 5,014,193 | 5/1991 | Garner et al. . |
| 5,021,983 | 6/1991 | Nguyen et al. . |
| 5,027,273 | 6/1991 | Letwin . |
| 5,027,294 | 6/1991 | Fakruddin et al. . |
| 5,083,266 | 1/1992 | Watanabe . |
| 5,086,387 | * 2/1992 | Arroyo et al. ............... 395/550 |
| 5,136,694 | 8/1992 | Belt et al. . |
| 5,142,684 | 8/1992 | Perry et al. . |
| 5,155,840 | 10/1992 | Niijima . |
| 5,163,153 | 11/1992 | Cole et al. . |
| 5,167,024 | * 11/1992 | Smith et al. ............... 395/375 |
| 5,175,845 | 12/1992 | Little . |
| 5,175,853 | * 12/1992 | Kardach et al. ............ 395/650 |
| 5,182,810 | * 1/1993 | Bartling et al. ............. 395/750 |
| 5,189,647 | * 2/1993 | Suzuki et al. ............... 368/10 |
| 5,214,762 | 5/1993 | Bush et al. . |
| 5,218,704 | * 6/1993 | Watts, Jr. et al. ........... 395/750 |
| 5,230,074 | 7/1993 | Canova, Jr. et al. . |
| 5,237,692 | 8/1993 | Raasch et al. . |
| 5,241,680 | 8/1993 | Cole et al. . |
| 5,254,888 | * 10/1993 | Lee et al. .................... 307/480 |

* cited by examiner

IMPLEMENTATION OF IDLE MODE IN A SUSPEND/RESUME MICROPROCESSOR SYSTEM

This application is a continuation of U.S. Ser. No. 07/942,120, filed Sep. 8, 1992 (now abandoned), which is a continuation in part of U.S. Ser. No. 07/866,787, filed Apr. 3, 1992 (now abandoned).

FIELD OF THE INVENTION

This invention relates to a portable computer having a standby mode in which system operation can be halted in order to conserve power and, more particularly, relates to such a system having an idle mode which is a reduced power mode that can be entered and exited in a manner transparent to a user.

BACKGROUND OF THE INVENTION

Portable computers of the type commonly referred to as laptop computers or notebook computers are becoming increasingly popular. An existing notebook computer has a standby mode in which certain peripherals are placed in a reduced power mode, including deactuation of the display, and in which the processor is halted in order to conserve power. While the standby capability has been entirely appropriate for its intended purposes, it has not been satisfactory in all respects.

In particular, when the system enters the standby mode, it is very visible to the user that the standby mode has been entered, because the computer turns the display off and halts program execution. Further, if the user presses a key or a push-button switch in order to exit standby mode and return to normal operation, a noticeable time interval usually elapses before the system is again running normally, which can be very annoying to a user.

It is therefore an object of the present invention to provide a computer system having a further mode which provides a level of power reduction over a normal operational mode but which is effectively imperceptible to the user.

SUMMARY OF THE INVENTION

The objects and purposes of the invention are met according to one form of the invention by providing a computer system which has a processor operable in a normal operational mode and in a reduced power mode, and an arrangement responsive to the absence of a predetermined event during a predetermined time interval for automatically switching the processor from the normal operational mode to the reduced power mode, the processor carrying out program execution in each of the normal operational mode and the reduced power mode.

Another form of the present invention involves the provision of a computer system which has a processor which can carry out program execution in each of first, second and third operational modes, the processor consuming less power in the second operational mode than in the first, and consuming less power in the third operational mode than in the second; an arrangement responsive to the absence of a first predetermined event during a first predetermined time interval for automatically switching the processor from its first operational mode to its second operational mode, and an arrangement responsive to the absence of both the first predetermined event and a second predetermined event different from the first predetermined event during a second predetermined time interval different from the first predetermined interval for automatically switching the processor from its second operational mode to its third operational mode.

BRIEF DESCRIPTION OF THE DRAWINGS

Two preferred embodiments of the invention are described in detail hereinafter with reference to the accompanying drawings, in which.

DETAILED DESCRIPTION

Figure 1A:
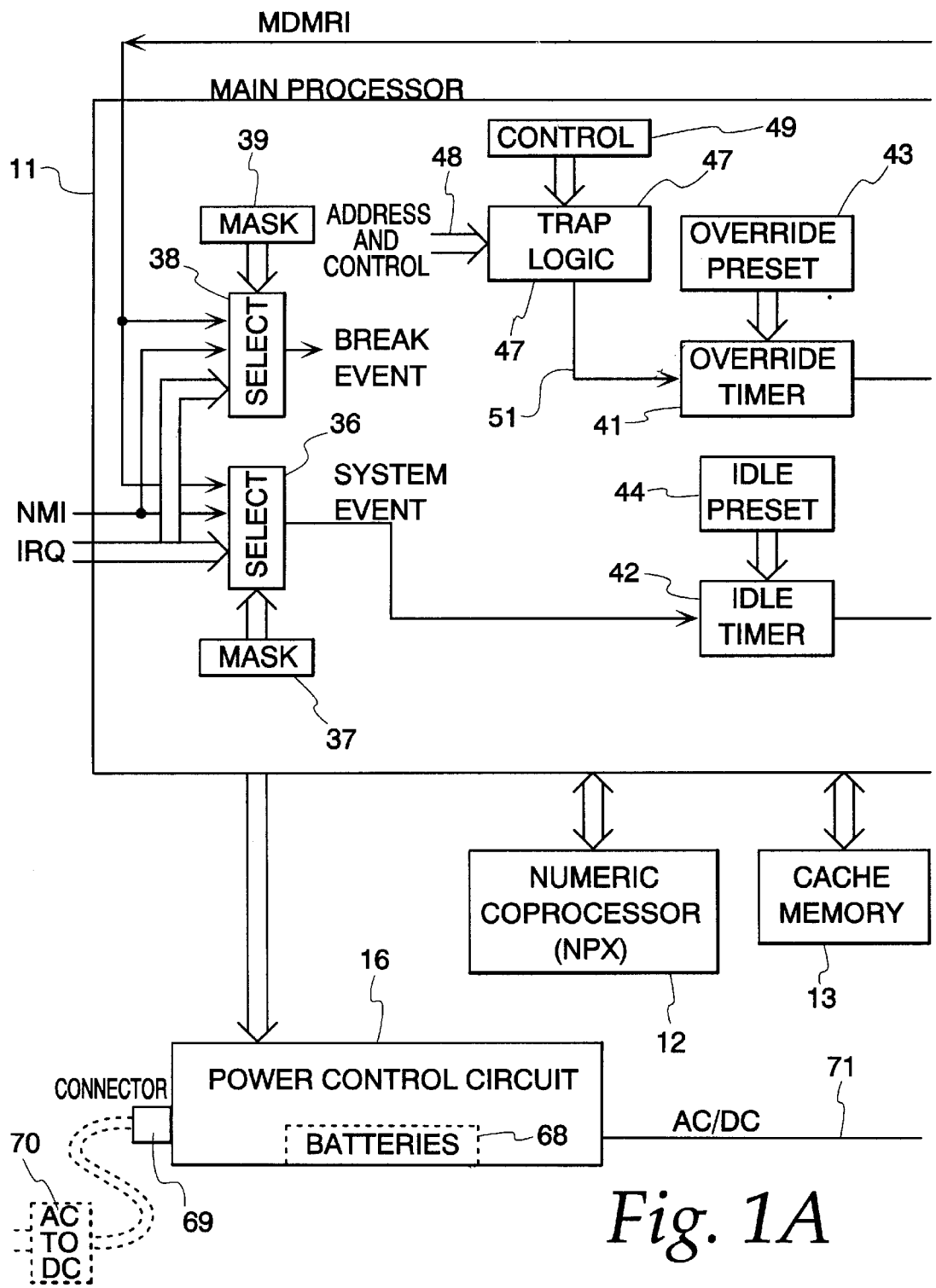
FIG. 1 is a block diagram of a computer system embodying the present invention.
Figure 1B:
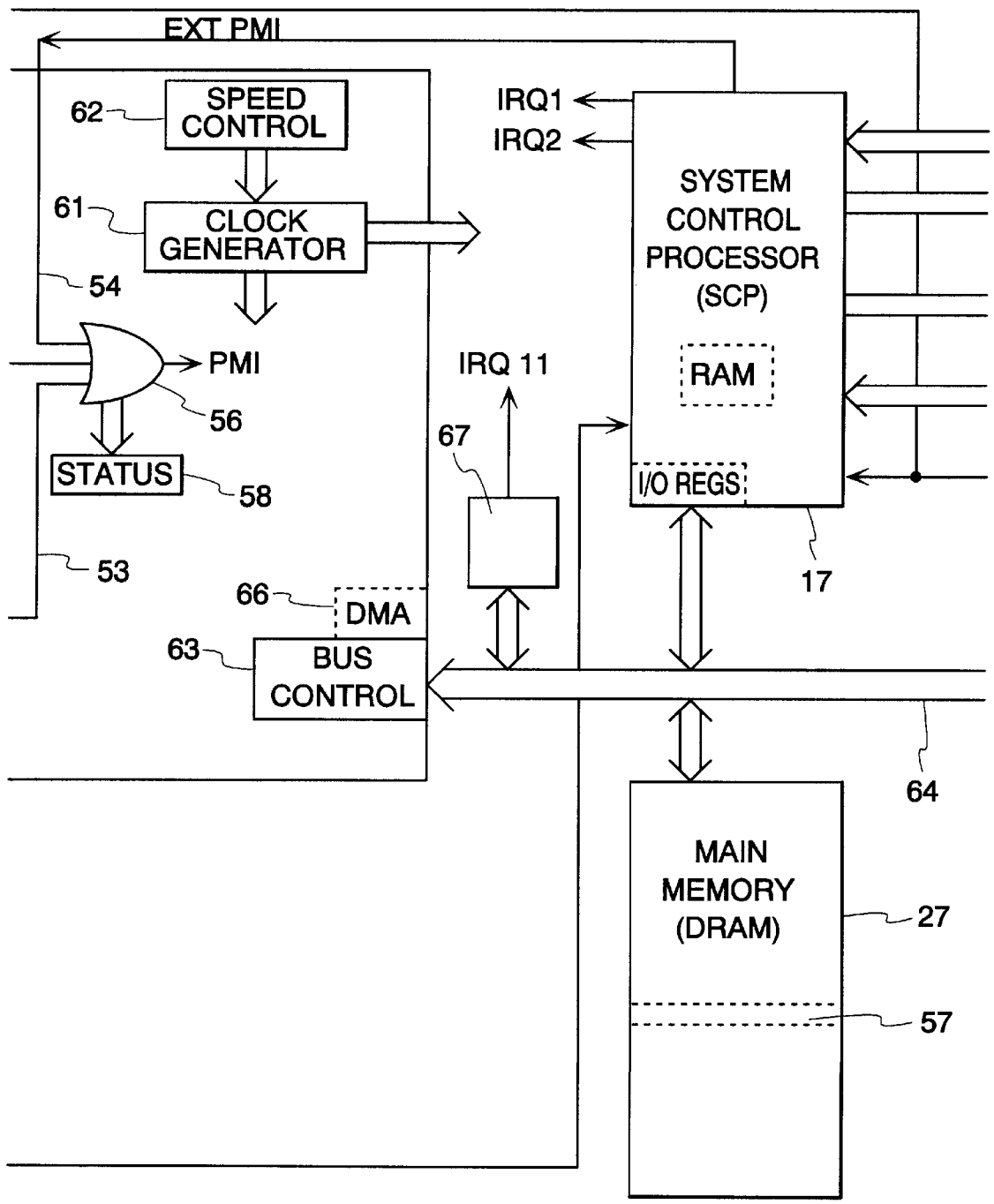
Figure 1C:
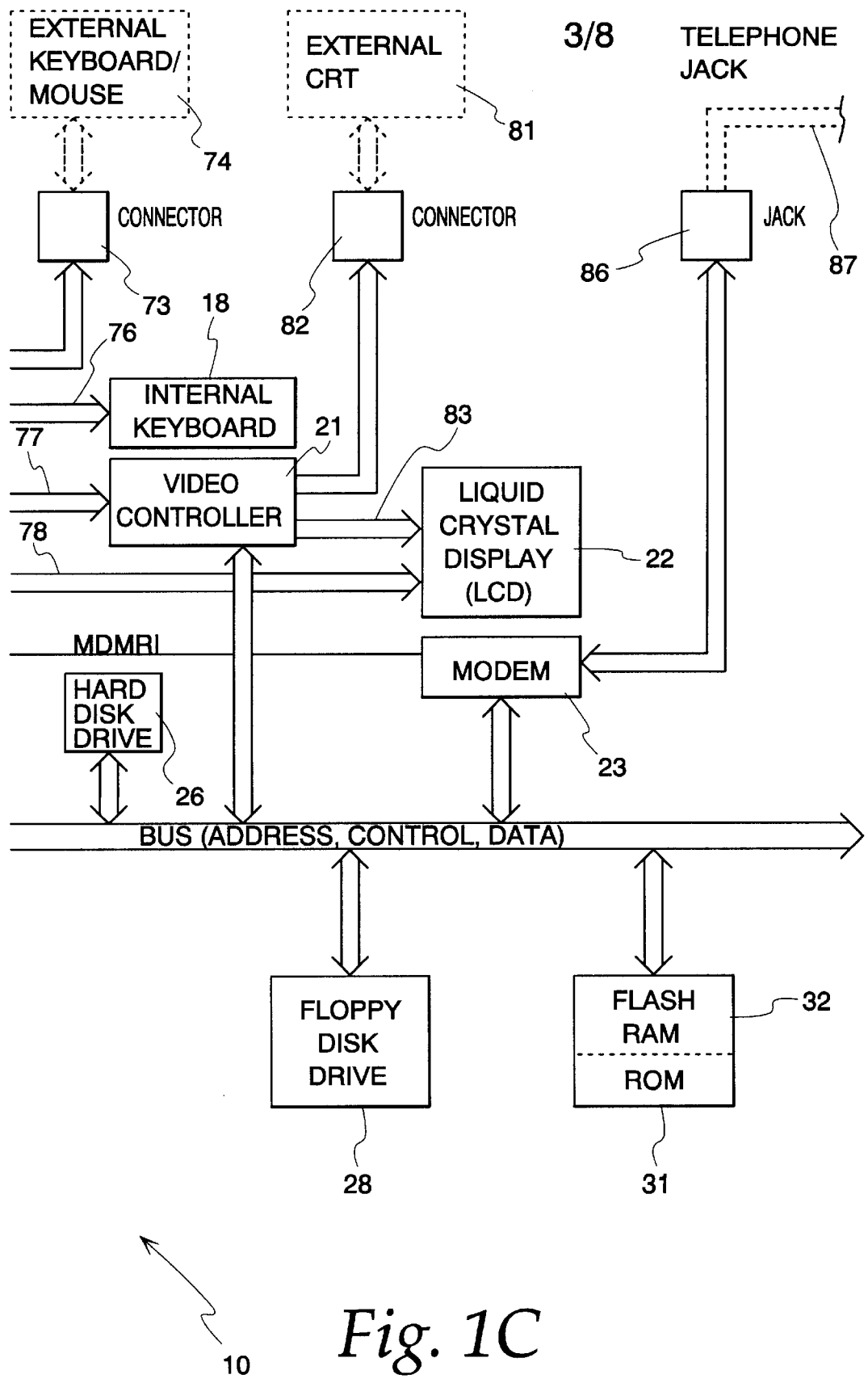

FIG. 1 is a block diagram of a "notebook" type laptop computer system 10 which embodies the present invention. The computer system 10 includes a main processor 11, a numeric coprocessor (NPX) 12, a cache memory 13, a power control circuit 16, a system control processor (SCP) 17, an internal keyboard 18, a video controller circuit 21, a monochrome liquid crystal display (LCD) unit 22, a modem 23, a hard disk drive (HDD) 26, a main memory 27 implemented with dynamic random access memory (DRAM) chips, a floppy disk drive (FDD) 28, a read only memory (ROM) 31, and a flash RAM 32.

In the preferred embodiment, the main processor 11 is implemented with an Intel 386SL microprocessor, which is a conventional component commercially available from Intel Corporation of Santa Clara, Calif. This microprocessor has certain special features which are described in U.S. Ser. No. 07/752,342 filed Aug. 30, 1991, which is a continuation-in-part of U.S. Ser. No. 07/705,039 filed May 17, 1991. The disclosures of each of these prior applications are hereby incorporated herein by reference. It will be recognized that other functionally equivalent microprocessors may be developed which could be used to implement the main processor 11. Detailed information regarding the 386SL is available from Intel, and its entire internal architecture is therefore not shown and described in detail here. In FIG. 1, only portions of the architecture which are important to an understanding of the present invention are depicted and described.

More specifically, the main processor 11 includes a system event selector 36 which has a plurality of inputs. Several interrupt signals collectively designated IRQ are connected to some of the inputs, a nonmaskable interrupt signal NMI is connected to another input, and a modem ring indicator signal MDMRI is connected to a further input. Other signals are also connected to inputs of the selector, but are not pertinent to the present invention and are therefore not illustrated and described. A mask register 37 can be loaded by software with a mask consisting of several bits which each correspond to a respective one of the input lines to the selector 36. As to each input to the selector, if the input signal is actuated and the associated bit in the mask register is a binary "1", the selector 36 will actuate its output SYSTEM EVENT (regardless of the states of other inputs and mask bits), whereas if the mask bit is a zero the selector will ignore the associated input line. The processor also includes a break event selector 38 and associated mask register 39 which are functionally equivalent to the selector 36 and mask register 37, and receive the same input signals.

The output of the break event selector 38 is a BREAK EVENT signal.

The processor 11 includes a number of hardware timers, two of which are shown at 41 and 42. The manufacturer of the processor refers to these as a local standby timer and a global standby timer, but they are respectively referred to herein as an override timer and an idle timer in order to more accurately reflect the particular functions for which they are used according to the invention. Associated with each timer is a respective preset register 43 or 44, which is controlled by software and can be set to enable or disable the associated timer. Further, each preset register includes a numerical value which defines the time interval that the associated timer is to measure. The SYSTEM EVENT signal is connected to the timer 42, and each time this signal is actuated while the timer 42 is enabled it causes the timer 42 to restart the timing of its specified time interval. When a user is actively using the system, the SYSTEM EVENT signal will be actuated so frequently that the timer 42 will typically not be able to time out its full specified time interval. On the other hand, if the user walks away from the system for a period of time, the SYSTEM EVENT signal may remain deactuated for a period of time, depending on the particular program being executed, in which case the timer 42 may time out.

The processor 11 includes a trap logic circuit 47, which receives address and control information at 48 and which is controlled by a control register 49. The register 49 is set by software and, in the preferred embodiment, defines a range of input/output (I/O) addresses which are not accessed during normal system operation. If one of the addresses in this range is accessed, the trap logic circuit 47 generates a signal at 51 which resets the override timer 41. However, since the range of addresses has been intentionally selected to include only addresses which should not be normally accessed, during normal system operation the output 51 of the trap logic circuit 47 should never be actuated and should thus never restart the override timer 41. Consequently, and as discussed in more detail later, the override timer 41 is intended to run until it expires, unless the software restarts it or disables it before it reaches expiration.

The override timer 41 has an output 52 which is actuated when the timer expires, and the idle timer 42 has an output 53 which is actuated when the timer expires. The timer output 52, the timer output 53, and an external PMI signal 54 generated by the SCP 17 are connected to respective inputs of an OR gate 56, the output of the OR gate being a PMI signal.

The PMI signal is a special interrupt signal, which causes the main processor 11 to automatically save part of its internal state in a special portion 57 of the main memory 27, and to then begin execution of a special interrupt handler routine which will be discussed later. At the end of this interrupt handler routine, the processor executes a restore instruction which causes the saved state to be restored to the processor from the portion 57 of the main memory 27.

The processor 11 is capable of operating in different modes, including modes commonly known as protected mode and unprotected mode. In unprotected mode, a program executing in the processor 11 is capable of using all of the capabilities of the processor 11, whereas a program operating in protected mode is allowed to use some of the capabilities of the processor but not other capabilities. When the processor state is saved in response to a PMI interrupt, the processor automatically switches to the unprotected mode so that the PMI handler routine has full access to the capabilities of the processor. When the saved state is restored at the end of the PMI handler routine, the mode (protected or unprotected) which was in effect at the time of the PMI interrupt is restored because it is part of the saved state, and the processor continues executing in that mode from the point at which it was interrupted. Also, in response to actuation of the PMI signal, a status register 58 is automatically loaded with an image of the logical states of the inputs to the gate 56, so that software can subsequently examine the register 58 and identify which of the inputs to the gate was responsible for generating the PMI interrupt signal.

The processor 11 also includes a clock generation circuit 61 which generates respective clocks used by the processor and by other components. A speed control register 62 can be set by software to select one of two or more frequencies for each clock signal, or to completely stop the clocks. The processor 11 and certain other components are constructed so that power consumption within them is dependent on the clock speed, and in particular is lower for lower clock speeds.

The processor 11 also includes a bus control circuit 63, which controls a bidirectional bus 64 carrying address, control and data information between the processor 11 and other major components of the system. Associated with the bus control circuit 63 is a direct memory access (DMA) circuit 66, which can control certain transfers across the bus. A circuit 67 is coupled to the bus 64 and detects situations where the bus is being used to write information into video control registers or a video memory located in the video controller 21, in response to which the circuit 67 actuates its output line IRQ11, which is one of the IRQ lines coupled to inputs of the selectors 36 and 38.

The power control circuit 16 includes batteries 68 which can supply power to the system. The power control circuit 16 also has a connector 69 to which a conventional AC to DC converter 70 can be connected, so that power can be provided to the system from a standard 110 volt wall outlet. The power control circuit 16 outputs an AC/DC signal on line 71, which is connected to the SCP 17, in order to tell the SCP whether the system is currently operating on AC power from converter 70 or is operating on DC power from the batteries 68.

Turning to the SCP 17, the SCP in the preferred embodiment is based on an Intel 87C51GB processor, but it will be recognized that there are other commercially available processors which could be used for the SCP. The SCP is coupled to an external connector 73, to which can be optionally coupled a conventional mouse or external keyboard 74. The SCP 17 is also coupled at 76 to the internal keyboard 18, at 77 to the video controller 21, and at 78 to the display 22. A conventional external CRT display 81 can be optionally plugged into a connector 82, which is coupled to the video controller 21. The video controller is also coupled at 83 to the display 22. The SCP 17 can selectively generate the previously-mentioned external PMI signal on line 54. The SCP also actuates interrupt line IRQ1 to the main processor when the user presses a key on either keyboard, and actuates interrupt line IRQ12 when the user moves or clicks the mouse.

The computer system 10 includes a conventional telephone jack 86, which is coupled to the modem 23 and can optionally be coupled to a conventional telephone line 87. If the modem 23 is on and receives an incoming call from the telephone line 87, it produces a signal on the previously-mentioned modem ring indicator line MDMRI.

The hard disk drive 26 and floppy disk drive 28 are each conventional and commercially available components.

The flash RAM 32 is a conventional semiconductor device which can be electrically modified, but is not volatile and will retain the information stored in it when power to it is turned off. The ROM 31 contains a program which is normally not used, but which can be used to control the system while the flash RAM 32 is reloaded in the event an unusual circumstance causes the contents of the flash RAM to be lost.

Before explaining pertinent portions of the programs running in the main processor and the SCP, a brief overview will be given of the idle mode, which is a part of the present invention. In the preferred embodiment, the preset for the idle timer at 44 in FIG. 1 is set to a value representing 8 seconds. So long as there is system activity generating input signals to the system event selector 36, the selector 36 will be producing periodic pulses on the SYSTEM EVENT line, which periodically restart the idle timer 42 and prevent it from expiring. The most common source of active input signals to the system event selector 36 is the group of interrupt lines IRQ, including IRQ1 which is generated by the SCP 17 when a user presses a key on the keyboard, IRQ12 which is generated by the SCP when the user generates input with a mouse, and IRQ11 which is generated when the executing program writes data to registers or memory in the video controller 21. Consequently, if the timer 42 does expire, it is because a period of eight seconds has elapsed without any such activity.

Following eight seconds of inactivity, the computer system 10 enters the idle mode, in which the system continues to operate but with certain power saving factors, such as having the processor 11 run at a slower clock speed. The idle mode is entirely transparent to the user, in that there is no visible sign to the user that the system has entered or exited idle mode. If certain events occur while the system is in idle mode, for example if the user presses a key or the executing program reaches a portion where it updates the video display, the system will initiate an exit from the idle mode. On the other hand, if the system remains in the idle mode for a predetermined period of time, then the system will automatically transition to a standby mode, which in and of itself is conventional.

In the standby mode, various system peripherals are shifted to a low power state, the backlight for the video display is turned off, and the processor 11 is halted. Obviously, the standby state is visible to the user, because the backlight is turned off. If an event such as a keypress occurs while the system is in standby mode, the break event selector 38 will actuate its BREAK EVENT output, which will cause the processor 11 to start running again and to restore peripherals to their normal operational state. Since the standby mode is itself conventional, it is not discussed here in further detail. The system is technically capable of entering a further mode which is called suspend mode or rest mode, in which power is shut off to substantially all of the system. However, the suspend mode is conventional and not pertinent to an understanding of the present invention, and is therefore not described in detail.

Figure 2:
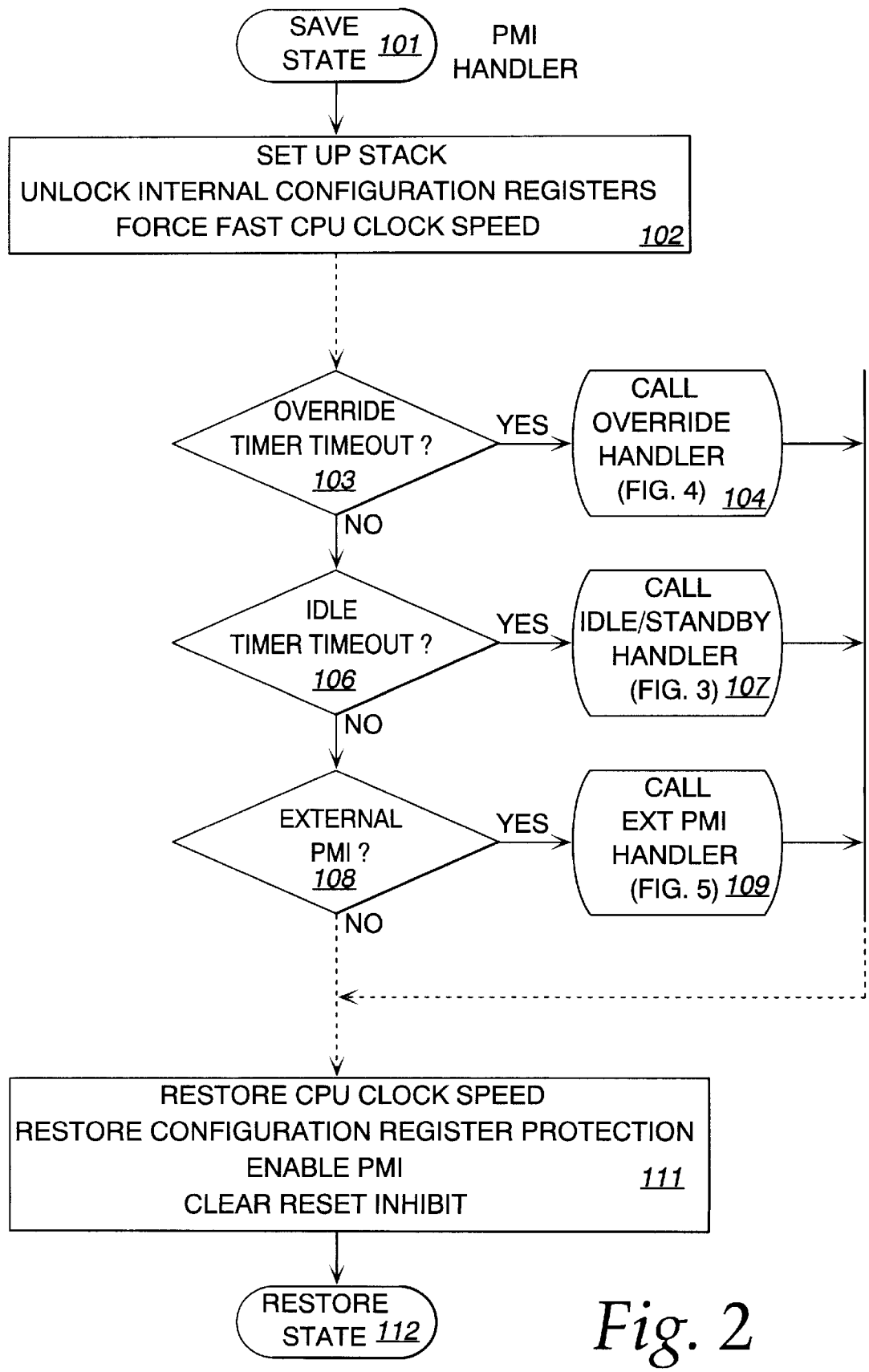
FIGS. 2–5 are flowcharts which show respective portions of a program executed by a main processor which is a component of the system of FIG. 1.

FIGS. 2–5 are flowcharts of respective portions of a program executed by the main processor 11. FIG. 2 shows pertinent portions of a PMI handler routine which is executed in response to a PMI interrupt. More specifically, when the processor is executing an application program, a PMI from any source causes the hardware of the processor 11 to automatically save its state in the portion 57 of the main memory 27, as shown diagrammatically at block 101 in FIG. 2. Then, the processor 11 automatically begins execution of the PMI handler routine at a predetermined point, which is shown at 102 in FIG. 2. In particular, the PMI handler begins by setting up a special stack for its own use in the portion 57 of the memory 27, and unlocks certain internal configuration registers so that they can be altered, including the control register 62 which is used to change clock speeds. Then, the processor changes the register 62 in order to force the CPU to run at its fastest clock speed, so that the PMI routine will execute as fast as possible.

The processor 11 then checks the bits of the status register 58 in order to determine what event initiated the PMI interrupt. In particular, at 103 the processor checks a bit of the status register 58 to determine if the PMI was caused by expiration of the override timer 41, and if so proceeds to block 104 where it calls an override handler discussed in more detail later. Otherwise, control proceeds to block 106, where the processor checks the status register to see if the PMI was caused by expiration of the idle timer 42 and, if so, proceeds to block 107 where it calls an idle/standby handler discussed in more detail later. If the PMI was not caused by the expiration of the idle timer, then control proceeds from block 106 to block 108, where the processor checks to see if the PMI was caused by an external PMI signal generated on line 54 by the SCP 17. If so, control proceeds to block 109, where a call is made to an external PMI handler routine discussed in more detail later.

Ultimately, control will reach block 111 in FIG. 2, where the processor 11 will look in the state information saved in the portion 57 of the memory 27 at block 101 of FIG. 2, to determine the CPU clock speed which was in effect at the time the PMI interrupt occurred. The processor sets the control register 62 to restore the CPU to this clock speed. Then, the processor locks its internal configuration registers, so that they cannot be changed The processor then enables the occurrence of PMI interrupts, so that the next such interrupt will be serviced, and clears a reset inhibit status which prevents system resets from occurring while a PMI interrupt is being serviced. Finally, at 112, an instruction is executed which causes the saved state of the processor to be restored to the processor from the portion 57 of main memory 27. With its state restored, the processor continues execution of the interrupted application program from the location at which it was interrupted and as if it had not been interrupted.

Figure 3:
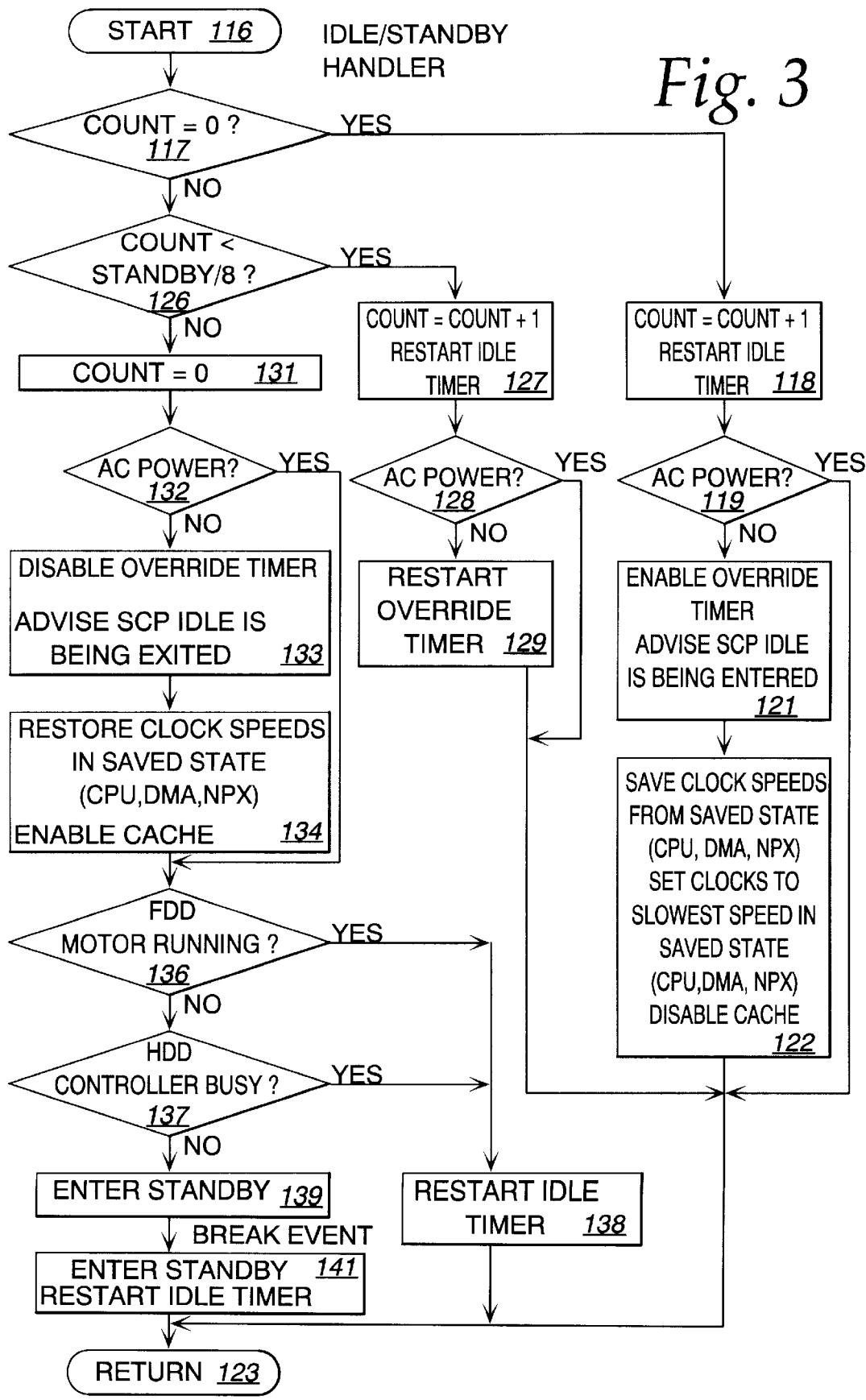

FIG. 3 is a flowchart of an idle/standby handler routine which is called by block 107 in FIG. 2 when the idle timer 42 expires. When the routine of FIG. 3 is called in response to expiration of the idle timer, execution begins at block 116 and proceeds to block 117. At block 117, the processor checks a software COUNT value, which is always initialized to zero when the system is first turned on. Accordingly, when the idle timer 42 first expires after a period of system activity, the COUNT will be zero and control will therefore proceed from block 117 to block 118, where COUNT is incremented and the idle timer is restarted. Then, at block 119, the main processor 11 obtains from the SCP 17 an indication of whether the system is operating on AC power or DC power. If operating on AC power, then the system does not enter idle mode, and in particular subsequent blocks 121 and 122 are skipped. However, if the system is operating on DC power, or in other words battery power, the system enters idle mode in blocks 121 and 122 in order to conserve power. In block 121, the processor enables the override timer 41 which, in the preferred embodiment, has a preset corresponding to a time interval of 12 seconds, or in other words a preset a little longer than the 8 second preset of the idle timer. Then, the main processor 11 advises the SCP 17 that idle mode is being entered. In block 122, the processor 11 extracts the clock speeds for the CPU 11, DMA 66 and NPX 12 from the data saved in the portion 57 of memory 27 at block 101 of FIG. 2. The processor 11 saves these clock speeds at a different location in the portion 57 of the memory. Then, in the saved state data in portion 57 of memory 27, the processor 11 changes the clock speeds for the CPU, DMA and NPX to the slowest possible speed for each. It is important to note that the PMI handler routine continues to run at the maximum clock speed, and thus the slow speed clocks will not be implemented until the saved state information is restored to the processor at block 112 in FIG. 2, or in other words when the application program is resumed. Finally, still in block 122, the processor 11 disables the cache memory 13. In some systems, disabling of the cache memory may cause the system to use more power than when the cache is enabled, in which case disabling of the cache can be omitted. However, in systems where disabling the cache memory reduces power consumption, it is implemented at this point.

In the preferred embodiment, the conventional hard disk drive 26 has internal circuitry which will automatically shift it to a reduced power mode when it has not been actively accessed for a period of time. Likewise, the conventional floppy disk drive 28, in conjunction with some conventional software, is shifted to a reduced power mode when it has not been actively accessed for a period of time. consequently, it is not necessary to forcibly shift either to a reduced power mode in blocks 121 and 122 of FIG. 3. However, in some systems the operational mode of these two drives may be under the direct control of the processor, in which case they could be shifted to reduced power modes in block 122.

Also, it would be possible to provide the usual parallel port interface circuitry, but with the capability for the main processor to shift this circuitry between a normal operational mode and a reduced power mode. In block 122, the processor could shift this interface circuitry to its reduced power mode as idle is entered.

It should be noted that the video display is not altered as idle mode is entered. The user will continue to see the usual screen display and thus will not realize that idle mode has been entered.

From block 122, control proceeds to block 123, where a return is made to the calling routine of FIG. 2, and then a return at 112 to the interrupted application program.

Assuming that there is a continued period of inactivity, after eight more seconds the idle timer will expire again. It should be noted that the twelve second override timer will still have four seconds remaining. Thus, expiration of the idle timer causes a further entry to the PMI handler of FIG. 2, which will in turn call the routine of FIG. 3 again. Since COUNT was previously incremented at block 118, it will not be zero when checked at block 117, and control will therefore proceed to block 126.

As mentioned above, it is possible for the system to go from idle mode to the standby mode or alternatively to suspend mode. For purposes of this discussion, it is assumed that the system is configured to go from idle to standby. The system determines whether it is time to enter standby mode by counting the number of times the idle timer expires. For example, if the system is to enter standby mode two minutes after it enters idle mode (if there is no intervening system activity), then the system counts 15 timeouts of the idle counter (8 seconds×15=120 seconds=2 minutes). Therefore, in block 126, COUNT is compared to a value which is the standby period divided by 8 seconds. If COUNT has not yet reached this value, then control proceeds to block 127, where COUNT is incremented and the idle timer is restarted. At 128, the processor checks to see if the system is operating on AC power. If it is, then idle mode is not in effect and block 129 is skipped. Otherwise, control proceeds to block 129, where the override timer is restarted. Control then proceeds to block 123 where a return is made to the calling routine of FIG. 2, and then at 112 to the interrupted application program.

It is possible for the user to specify that there is to be no automatic transition from idle mode to standby or suspend mode, in which case the standby time interval is set to a very long period and thus block 126 compares COUNT to a very large value which as a practical matter COUNT cannot reach, and control will always go from block 126 to block 127 until the system exits idle mode. However, for purposes of this discussion, it is assumed that the user has enabled a transition from idle to standby. After the idle timer has expired several times and the processor has executed the branch containing blocks 127–129 several times, the idle timer will expire again, and in FIG. 3, it will be determined at 126 that the count has now reached a value corresponding to the standby interval divided by 8 seconds. This means that standby mode is to be entered. Control therefore proceeds to block 131, where COUNT is reset to zero. Then, at block 132, the processor checks to see if the system is operating on AC power. If it is, then idle mode is not in effect and there is no need to execute blocks 133 and 134 in order to exit idle mode. On the other hand, if it is found at block 132 that the system is operating on DC power, then at block 133 the processor disables the override timer and advises the SCP that idle mode is being exited. Then, at block 134, it changes the saved state of the processor in the portion 59 of the main memory 27 in a manner restoring the clock speeds which were in effect when the state of the processor was actually saved in the portion 57 of the memory 27. Again, it should be noted that these clock speeds do not immediately take effect. Instead, the processor 11 continues operating at its maximum clock speed until it eventually reaches block 112 of FIG. 2 and restores its prior state from the portion 57 of the memory 27, at which point the clock speeds in the saved state are actually implemented for purposes of continuing the interrupted application program. Finally, still in block 134, the cache memory is enabled. In systems where the processor must directly control the operational modes of the hard disk drive, floppy disk drive, and/or parallel port, these components would also be restored to a normal operational state at this point.

The system cannot enter standby mode if the floppy disk drive is busy or the hard disk drive is busy. Accordingly, at blocks 136 and 137, the state of each of these drives is checked, and if either is busy then the entry to standby mode is cancelled and control proceeds to block 138, where the idle timer is restarted. Then, a return is made at 123 to the calling routine of FIG. 2, and eventually at block 112 the system returns to execution of the interrupted application program.

On the other hand, if the floppy disk drive and hard disk drive are not busy, then control proceeds from blocks 136 and 137 to block 139, where the system enters the standby mode. As mentioned above, the system could alternatively enter the suspend mode, but this is not important for purposes of the present invention and it is therefore not described in detail. The various steps carried out to prepare for entry to the standby mode are conventional, and they are therefore not shown in detail in block 139. When the processor 11 enters the standby mode in block 139, it stops its clock and thus halts. It remains in the halted state until one of the inputs to the break event selector 38 is actuated and in turn actuates the BREAK EVENT signal, which at 141 causes the processor to restart its clock and then perform in reverse order the sequence of events carried out to enter the standby mode. In block 141, the idle timer 42 is also restarted. Then, at block 123, a return is made to the calling routine of FIG. 2.

Once the system has entered the idle mode, the 8-second idle timer 42 should normally time out before the 12-second override timer 41. However, if an event occurs which actuates the SYSTEM EVENT signal, for example actuation of the modem ring indicator signal MDMRI in response to an incoming telephone call, then the SYSTEM EVENT signal will restart the idle timer before it expires, and thus the 12-second override timer 41 will eventually expire before the restarted idle timer and will produce a PMI interrupt. As previously mentioned, this will be detected at block 103 in FIG. 2 and will result in a call to a routine shown in FIG. 4. The routine of FIG. 4 will typically handle functions other than just expiration of the override timer, but only the portion of this routine which handles the override timer is pertinent to the present invention and therefore only this portion is shown and described in detail.

Figure 4:
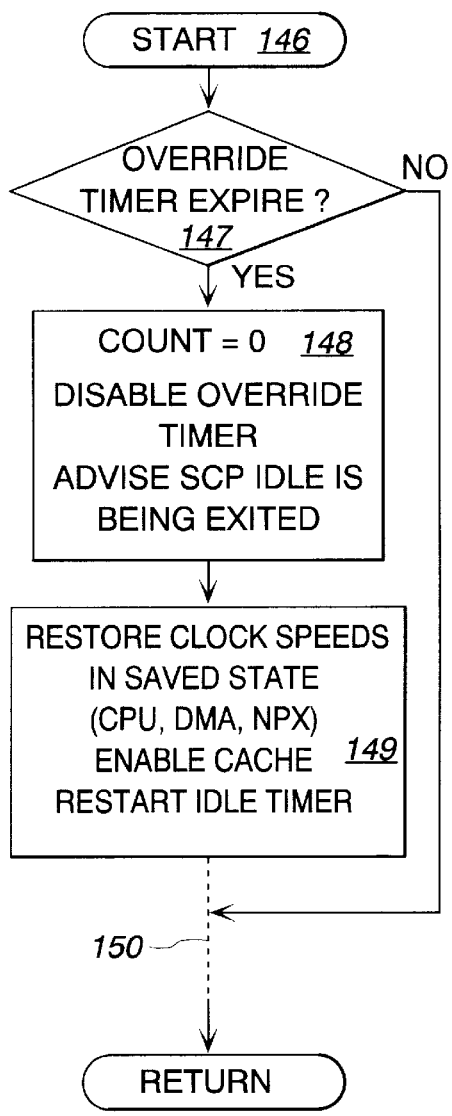

Execution in FIG. 4 begins at block 146, and at block 147 the processor checks to see if the cause of the PMI was expiration of the override timer. If not, exiting from the idle mode at blocks 148 and 149 is skipped, and the processor continues at 150 to look for other sources of the PMI. On the other hand, if it is determined at block 147 that the override timer has expired, it means that a system event has occurred and restarted the idle timer, and that idle mode should be exited. Accordingly, at block 148, COUNT is set to zero, the override timer is disabled, and the SCP is advised to exit idle mode. Then, at block 149, the clock speeds saved at block 122 in FIG. 3 are restored to the saved state information in portion 57 of memory 27, the cache is enabled, and the idle timer 42 is restarted. Execution then continues at 150.

It should be evident that, when a system event occurs and resets the idle timer, it may be several seconds before the override timer expires and brings the system out of idle mode. In the case where a user presses a key on the keyboard, it is desirable that the system immediately exit idle mode. Accordingly, when the SCP 17 detects that a key has been pressed, it not only actuates interrupt line IRQ1 in order to coordinate transfer to the processor 11 of a control code representing the key which was pressed, but in addition it actuates the external PMI line 54 in order to create a PMI interrupt in the processor 11. In FIG. 2, the fact that the PMI was initiated by the SCP is detected at block 108, and in block 109 the processor calls the external PMI handler routine, which is shown in FIG. 5.

Figure 5:
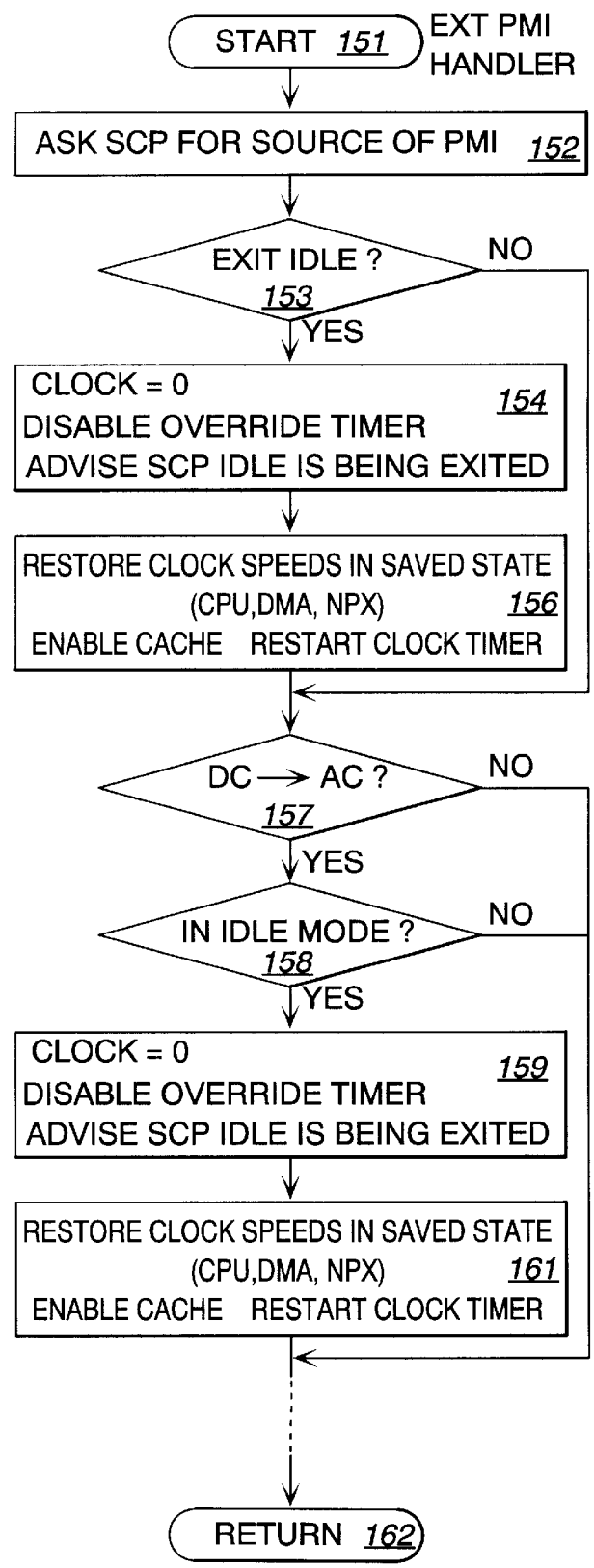

Execution of the routine of FIG. 5 begins at block 151, and at block 152 the main processor 11 asks the SCP 17 to identify the reason for the external PMI. In reply, the SCP 17 returns a PMI byte having several bits which can be set to indicate respective causes for the PMI. At block 153, the processor 11 checks the PMI byte to determine if the SCP is instructing it to exit idle mode as a result of pressing of a key on one of the internal and external keyboards, or as a result of input from a mouse 74. If not, then blocks 154 and 156 are skipped. However, if the SCP has indicated that idle mode is to be exited, then blocks 154 and 156 are executed in order to exit the idle mode. Blocks 154 and 156 are similar to blocks 148 and 149 in FIG. 4.

At block 157, the processor 11 checks the PMI byte to see if the SCP 17 has just detected a switch from DC power to AC power. Since power consumption is less critical in the AC mode, idle mode can be exited if the AC mode is in effect. Therefore, in block 158, the processor checks to see if it is currently in idle mode. If it is, then blocks 159 and 161 are executed in order to exit idle mode, these blocks being identical to blocks 154 and 156. Otherwise, blocks 159 and 161 are skipped.

Ultimately, control proceeds to block 162, where a return is made to the calling routine of FIG. 2.

Figure 6:
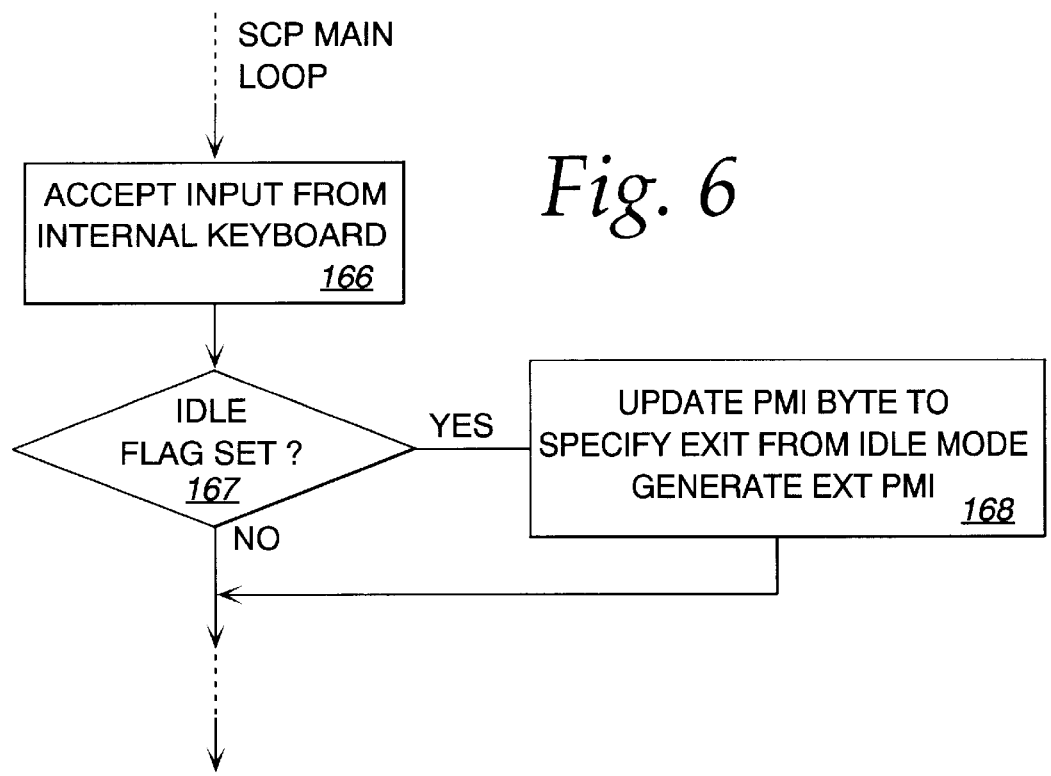
FIGS. 6–9 are flowcharts of respective portions of a program executed by an auxiliary processor which is a component of the system of FIG. 1.

FIGS. 6–9 are flowcharts of pertinent portions of the program executed by the system control processor (SCP) 17. FIG. 6 shows a portion of the main loop of the SCP program. At block 166, the SCP accepts input from the internal keyboard 18 in response to a user pressing a key. Then, at block 167, the SCP checks to see if an internal idle flag is set. The idle flag is a software flag which is set by the SCP when the main processor advises the SCP that it is entering idle mode, and which is cleared by the SCP when the main processor advises the SCP that it is exiting idle mode. If the idle flag is set to indicate that the system is in idle mode, then the fact that the user has pressed a key on the keyboard means that the system needs to immediately exit idle mode. Accordingly, at block 168, the SCP updates its PMI byte to set a bit which instructs the main processor to exit idle mode, and then generates an external PMI on line 54.

Figure 7:
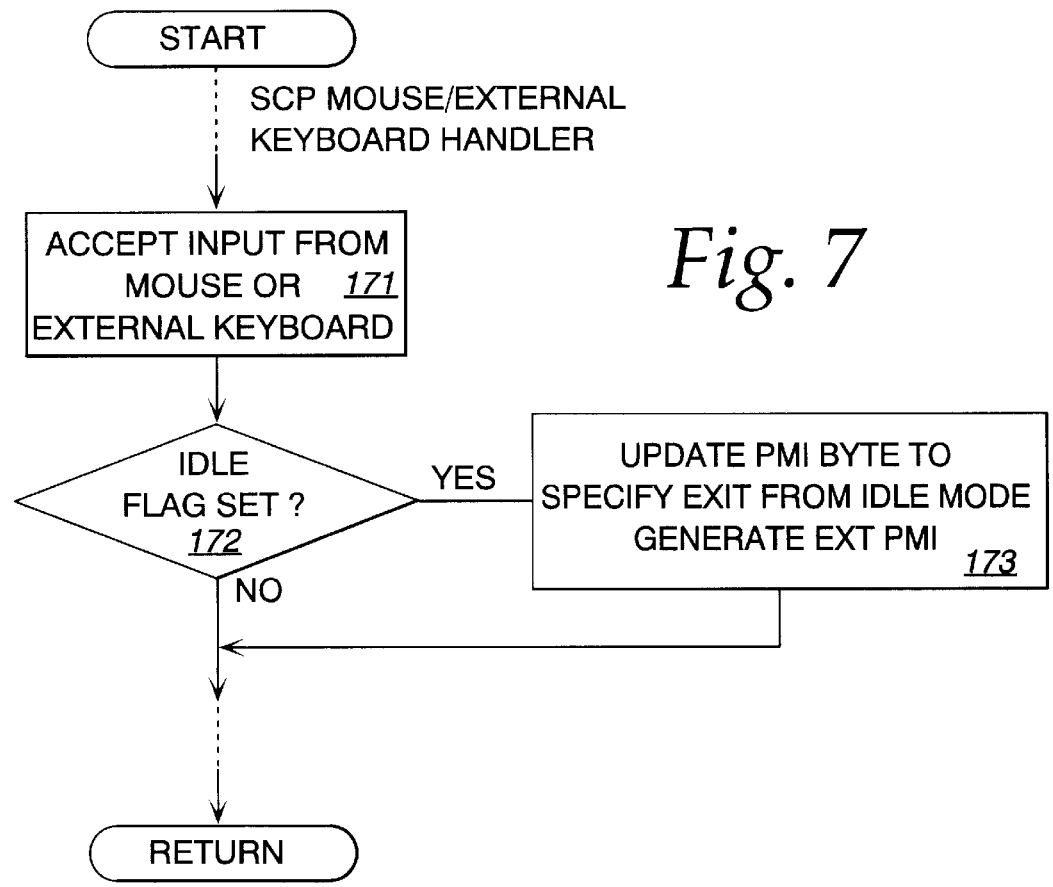

FIG. 7 shows a portion of a routine which handles input from a mouse or external keyboard connected to the system, and is similar to FIG. 6. In particular, input from the mouse or external keyboard is accepted at block 171, and if it is found at block 172 that the idle flag is set, then at block 173 the PMI byte is updated to set the bit instructing the main processor to exit idle mode, and then a PMI is generated.

Figure 8:
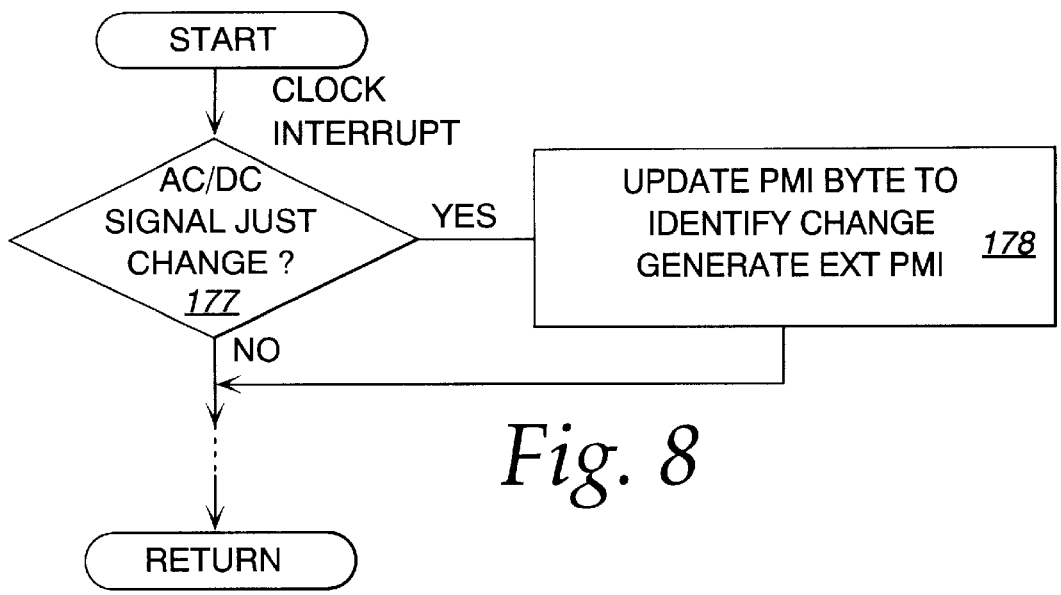

FIG. 8 depicts part of a clock interrupt routine in the SCP. The clock interrupt occurs periodically at predefined intervals. At block 177, the SCP 17 checks the AC/DC line 71 from the power circuit 16 in order to determine whether the power control circuit 16 has just switched from AC power to DC power, or vice versa. If so, then at block 178 the SCP updates the PMI byte to identify the particular change, and then generates a PMI.

Figure 9:
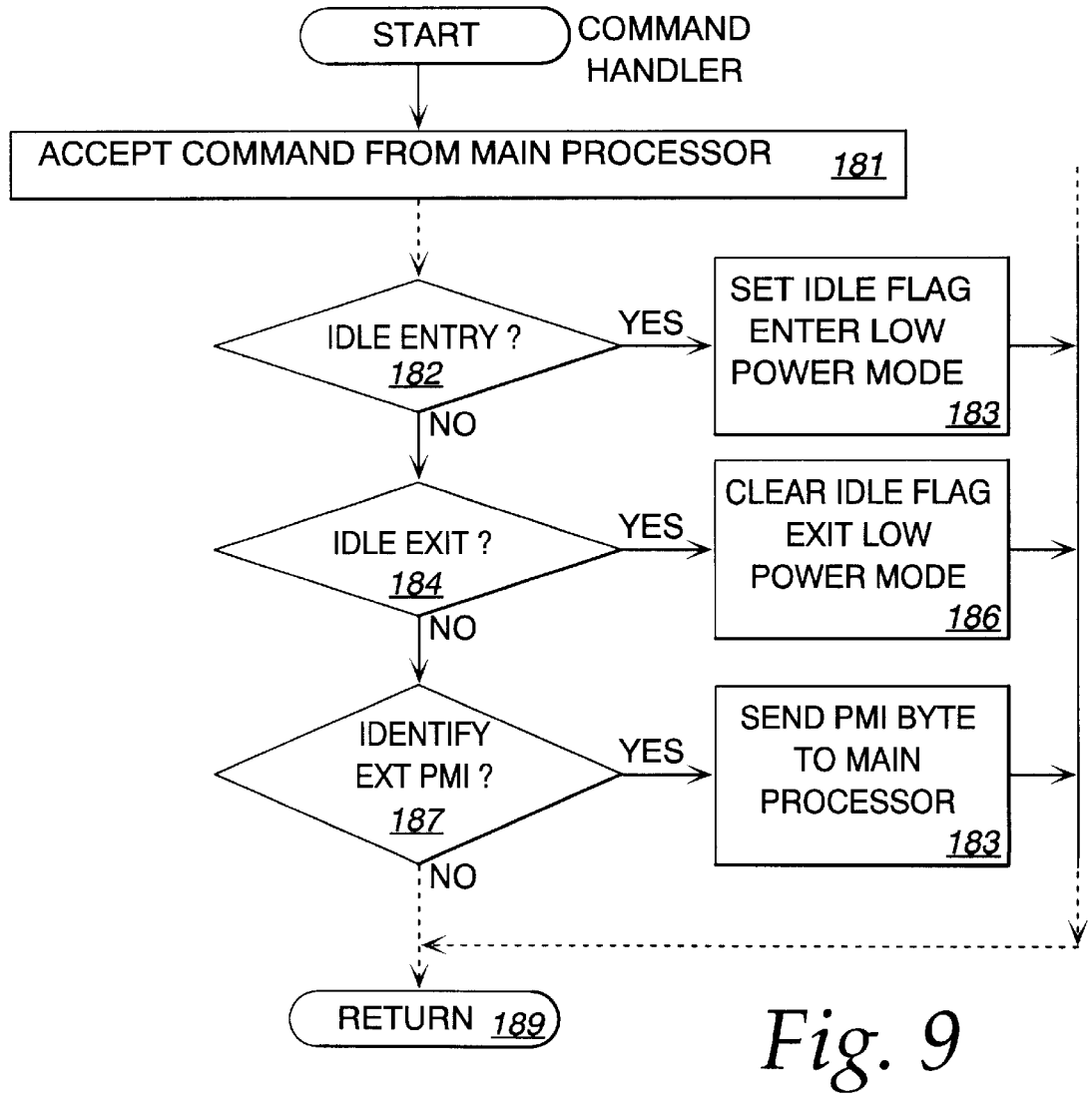

FIG. 9 shows a routine which is executed by the SCP when it receives a command from the main processor. The preferred embodiment includes many commands, but only three which are pertinent to the present invention are shown. In particular, at block 181 the SCP accepts a command from the main processor, and then examines the command in order to determine what the SCP is being instructed to do.

If it is determined at block 182 that the main processor is advising the SCP 17 that idle mode is being entered, then at block 183 the SCP sets its idle flag, and enters a low power mode in which it continues to operate but at a lower clock speed than normal. On the other hand, if it is determined at block 184 that the main processor is advising the SCP that it is exiting idle mode, then at block 186 the SCP clears its idle flag and then returns from its low power mode to its normal operational mode. Alternatively, if it is determined at block 187 that the main processor 11 is instructing the SCP 17 to identify the reason why the SCP generated an external PMI, then at block 188 the SCP sends the PMI byte to the main processor so that the main processor can examine the byte and determine the reason that the SCP generated a PMI. From each of blocks 183, 186 and 188, control proceeds to block 189, where a return is made.

A recent trend in software development has involved the provision of what is commonly known as a graphical user interface (GUI). Examples of GUI are the WINDOWS program commercially marketed by Microsoft Corporation, and the numerous application programs developed by other companies to run in conjunction with WINDOWS. In a program providing a GUI, the program generates video images by separately controlling each pixel. In contrast, other types of programs use conventional image-generating capabilities of the video controller 21. For example, the video controller 21 can be instructed to generate a character of the alphabet such as the letter "A" or a character such as a blinking cursor, and will continue to generate the requested character without further interaction from the main processor. In contrast, in order to produce a blinking cursor in a GUI or other true graphical image, the processor must periodically change the color and/or intensity of the set of pixels representing the cursor, and thus must make periodic accesses to the video controller 21 even when the system is doing nothing more than sitting and waiting for keyboard input from the user.

The above-described embodiment of FIG. 1 will reliably and accurately execute a program providing a GUI interface, but under certain circumstances will do so in the normal operational mode rather than the reduced power idle mode. For example, when the video image is displaying a blinking cursor in a graphical image, the periodic accesses by the processor 11 to the video controller 21 will cause the circuit 67 to periodically produce the IRQ11 signal, which in turn causes the selector 36 to periodically restart the idle timer 42 so that the idle timer 42 does not expire and the system does not enter idle mode, even when it otherwise could do so. Therefore, in order to also save power in circumstances where there is no significant system activity other than updating of a graphical image (for example to provide a blinking graphical cursor), Applicants have developed an alternative version of the system of FIG. 1, which is shown at 210 in FIG. 10. Components which are identical to those of FIG. 1 are identified with the same reference characters in the system 210 of FIG. 10. For convenience, only the differences between the systems of FIGS. 1 and 10 are described in detail here.

In FIG. 10, the processor 11 includes a deturbo timer 212 and a deturbo preset register 213. These components are actually present in the processor 11 of FIG. 1, but were not illustrated in FIG. 1 because they were not utilized in the embodiment of FIG. 1. The deturbo timer 212 and deturbo preset 213 are similar to the timers 41 and 42 and the preset registers 43 and 44, except that the restart input of the timer 212 is controlled by a signal TRIGGERA originating from a logic circuit 214, which is external to the processor 11 and which is described in more detail later. In the preferred embodiment, the deturbo preset register 213 is set to select a time interval of one half of a second. Each time the line TRIGGERA is actuated, the deturbo timer 212 is restarted.

The output line 216 of the deturbo timer 212 is connected to the speed control circuit 62. During normal system operation, the speed control circuit 62 causes the clock generator circuit 61 to supply clock signals to the processor 11 and to other components in the system at either full speed or at half of the full speed. As discussed in association with the embodiment of FIG. 1, slower clock speeds mean relatively lower power consumption, and the user can select whether normal operation will be carried out with clocks at full speed or at half of the full speed, depending on whether the user desires maximum computing speed or is willing to accept a reduced computing speed in order to extend the computing time available until the battery must be recharged. The particular speed selected by the user is referred to herein as the normal operational speed. The fact that the normal operational speed can be one of two different speeds selected by a user and the manner in which the selection occurs is conventional and not in and of itself a part of the present invention, and it is therefore not described here in detail.

The speed control circuit 62 can also cause the clock generator circuit 61 to generate clocks at one quarter of the full speed or at one eighth of the full speed, which are respectively referred to herein as deturbo speed and idle speed. When the deturbo timer 212 is disabled or is actively timing an interval, its output line 216 will have a state which causes the circuits 61 and 62 to generate clocks at the normal speed (except when the speed control circuit 62 has been set in a manner described later to select clock generation at the idle speed). When the deturbo timer 212 expires, its output line 216 changes state, in response to which the circuits 61 and 62 generate clocks at the deturbo speed rather than the normal operational speed (except when the register 62 has been set to select clock generation at the idle speed). Of course, during servicing of PMI interrupts, the processor uses the full speed clocks, and deturbo speed and idle speed are thus effective only outside the PMI handling routine.

The system 210 of FIG. 10 also includes a conventional serial interface circuit 221 which is coupled to the bus 64 and to a conventional external serial connector 222, a conventional parallel interface circuit 223 which is connected to the bus 64 and to a conventional external parallel connector 224, and a conventional network interface 226 which is coupled to the bus 64 and to a conventional connector 227 which can in turn be coupled to a conventional local area network (LAN) 228. These interface circuits and connectors may be included in the system of FIG. 1, but were not shown in FIG. 1 because they are not necessary to an understanding of the invention incorporated into the embodiment of FIG. 1.

The network interface circuit 226 outputs an interrupt signal IRQ15, which is coupled to one input of a three-input OR gate 231, the other two inputs of the OR gate being connected to the interrupt signals IRQ1 and IRQ12 from the SCP 17. The output of the OR gate 231 is a signal IRQX, which is coupled to an input of the logic circuit 214. The logic circuit 214 is shown in more detail in FIG. 11.

In the preferred embodiment, the logic circuit 214 of FIG. 11 is implemented in the form of a programmable array logic (PAL) chip, but could alternatively be implemented in the form of discrete logic components. The inputs to the circuit 214 include address and control information from the bus 64, in particular an input/output write signal IOW, an input/output read signal IOR, an address valid signal AEN, seven address lines SA3–9, a numerical coprocessor strobe signal NPXADS, a memory read signal MEMR, a memory write signal MEMW, and a video memory select signal VGACS. These address and control signals are all conventional outputs of the above-mentioned conventional Intel 386SL microprocessor, and are therefore not described in detail here. The inputs to the circuit 214 also include the combined interrupt signal IRQX from the gate 231, and a signal VIDCLR selectively generated by the SCP 17. The circuit 214 produces the signal TRIGGERA which is connected to the restart input of the deturbo timer 212, and two signals IOTRIG and VIDEO which are each connected to the SCP 17, the IOTRIG signal being connected to an interrupt input of the SCP, and the VIDEO signal being connected to a standard input port of the SCP 17.

The circuit 214 includes an input/output address decoding circuit 236, which monitors the address lines SA3–9 from the processor in order to determine whether the processor is outputting an address which falls within a first range of addresses assigned to the hard disk drive 26, a second range of addresses assigned to the serial interface 221, a third range of addresses assigned to the parallel interface 223, or a fourth range of addresses assigned to the video controller 21. If an address falls in one of these four ranges, the decoding circuit 236 actuates a respective one of four corresponding output lines. Those of ordinary skill in the art are thoroughly familiar with address decoding circuits and will fully understand the internal structure of the circuit 236, and the circuit 236 is therefore not illustrated and described in further detail.

The four outputs of the decoding circuit 236 are each connected to one input of a respective one of four AND gates 238–241. When the processor 11 is outputting a valid address for an input/output read or input/output write, the signal AEN and one of the signals IOR or IOW will be actuated, and thus the AND gate 242 will actuate its output. If the decoding circuit 236 has determined that the address is within one of the four ranges mentioned above, it will be actuating one of its four outputs, and thus one of the AND gates 238–241 will actuate its output. The output of AND gate 238 is a signal HDIO which indicates that an input/output access has been made to the hard disk, the output of the gate 239 is a signal COM which indicates that an input/output access has been made to the serial communication interface 221, the output of the gate 240 is a signal PPP which indicates that an input/output access has been made to the parallel interface 223, and the output of the gate 241 is a signal VGAIO which indicates that an input/output access has been made to the video controller 21.

An OR gate 246 has five inputs which are respectively connected to the signals HDIO, COM, PPP, NPXADS and IRQX, and has an output which is the signal TRIGGERA. Thus, the gate 246 produces the signal TRIGGERA in response to any one of an input/output access to the hard disk 226, an input/output access to the serial interface 221, an input/output access to the parallel interface 223, an access to the numeric coprocessor 12, the interrupt signal IRQ1 representing actuation of a key on either keyboard, the interrupt signal IRQ12 representing movement or clicking of the mouse, or the interrupt signal IRQ15 representing activity in the network interface 226. It should be noted that the signal TRIGGERA is independent of input/output and memory accesses to the video controller 21.

When the gate 246 actuates the signal TRIGGERA, an OR gate 247 generates the output signal IOTRIG, in response to which an AND gate 248 latches the IOTRIG signal in an actuated condition. When the SCP 17 outputs a pulse on its VIDCLR output, the gate 248 is momentarily disabled and clears the latched condition to thus cause the signal IOTRIG to return to its deactuated condition.

When a memory access is being made to the video controller 21, the signal VGACS and one of the signals MEMR and MEMW will be actuated, and thus the gate 249 will actuate its output. An OR gate 251 has inputs connected to the outputs of gates 241 and 249, and actuates its output when the gate 241 is actuated in response to an input/output access to the video controller 21 or when the gate 249 is actuated in response to a memory access to the video controller. Thus, through a further OR gate 252, the output signal VIDEO is actuated whenever there is either an input/output access or a memory access to the video controller 21. AND gate 253 latches the VIDEO signal, the latching condition being cleared in response to a pulse on the VIDCLR line from the SCP 17. As mentioned above, the IOTRIG and VIDEO signals are both connected to inputs of the SCP 17. It should be noted that the VIDEO signal is actuated only by an input/output access or memory access to the video controller 21, whereas the IOTRIG signal is actuated by several different system events but is not actuated any type of access to the video controller 21.

FIGS. 12, 13 and 14 are flowcharts of respective portions of a program executed by the main processor 11 of FIG. 10, and are modified versions of the flowcharts respectively shown in FIGS. 3, 4 and 5.

FIG. 12 represents the routine which is called when the idle timer 42 expires. Execution begins at 261, and at 262 the processor 11 checks to see if the value COUNT is zero or in other words whether this is the first time the idle timer has expired. If so, control proceeds to block 263, where the value COUNT is incremented and the idle timer is restarted. Also, the override timer 41 is started, and then the processor 11 advises the SCP 17 that idle monitoring has commenced, which involves monitoring system activity to determine whether system operation should be carried out at the idle speed. Then, the processor 11 sends a command to the SCP which asks whether there have been accesses to the video controller 21 within the past eight seconds. If, following receipt of a reply to this inquiry, it is found at block 264 that there have been video accesses, then the idle mode will not be entered, and block 266 is skipped. On the other hand, if there have been no video accesses for eight seconds, then control proceeds to block 266, where the processor 11 saves the clock speeds present in the saved state information, and then modifies the saved state information to set the clocks to the idle speed. Then, the cache memory is disabled. (As discussed above, disabling of the cache can be omitted in situations where disabling of the cache does not result in any significant reduction of power consumption). From block 266, control proceeds to block 267, where a return is made.

When the idle timer 42 again expires and the routine of FIG. 12 is again entered, control will proceed through blocks 261 and 262 to block 268, where the main processor 11 checks the value COUNT in order to determine whether the standby interval has elapsed. Where it has not elapsed, control will proceed to block 269, where the processor increments the value COUNT, restarts the idle timer, and also restarts the override timer. The processor then again asks the SCP whether there have been any video accesses during the past eight seconds. If it has determined at block 271 that there have not been any video accesses, then control proceeds to block 272, where the processor checks to see if it is already in idle mode. If it is, then the entry to idle mode in block 266 is skipped. Otherwise, control proceeds from block 272 to block 266, where the processor enters the idle mode in the manner described above. On the other hand, if it was determined at block 271 that there have been video accesses, then at block 273 the processor checks to see whether it is operating in idle mode. If it is not, then an exit from idle mode at block 274 is skipped. Otherwise, since idle mode is to be exited if there are video accesses, control proceeds to block 274, where the processor restores to the saved state information the clock speeds which it saved at block 266, and then enables the cache memory (if the cache was disabled at block 266). Control ultimately proceeds to block 267, where a return is made to the calling routine.

If the idle timer continues to periodically expire as a result of the absence of system activity, the routine of FIG. 12 will be periodically entered and, at some point, it will be determined at block 268 that the variable COUNT has reached a value in excess of that for the standby interval, and control will proceed to block 276 in order to begin the process of entry to the standby mode. In block 276, the variable COUNT is set to zero, and then in block 277 the override timer 41 is disabled and a command is sent to the SCP to advise the SCP that idle monitoring is being terminated. Then, in block 278, the processor 11 checks to see whether it is presently operating in idle mode. If it is, then at block 279 the processor restores to the saved state information the clock speeds which were saved at block 266, and then enables the cache memory (if the cache was disabled in block 266). Control ultimately proceeds to block 281, pursuant to which entry to and exit from the standby mode is carried out in a manner similar to that described above in association with blocks 136–139 and 141 of FIG. 3.

FIG. 13 is the routine which is executed in the event the override timer expires. As was the case with the corresponding routine of FIG. 4, the routine of FIG. 13 typically handles functions other than just expiration of the override timer, but only the portion of this routine which handles the override timer is pertinent to the present invention and shown in FIG. 13. Execution in FIG. 13 begins at block 286, and at block 287 the processor checks to see if the entry to the routine was the result of expiration of the override timer. If not, then at 288 the processor skips the flowchart blocks which handle the expiration of the override timer. On the other hand, if it is determined at block 287 that the override timer has expired, then at block 289 the processor sets the value COUNT to zero, disables the override timer, and notifies the SCP that idle monitoring is being terminated. Then, at block 291, the processor checks to see whether it has been operating at the idle speed. If not, then the exit from idle mode at block 292 is skipped. Otherwise, at block 292, the processor restores to the saved state information the clock speeds which it saved at block 266, and then enables the cache memory (if the cache memory was disabled in block 266). Then, at block 293, the processor restarts the idle timer 42.

The routine of FIG. 14 corresponds functionally to the routine of FIG. 5, and is the routine which is entered when the SCP 17 generates an external PMI. Execution begins at block 296, and at block 297 the main processor 11 asks the SCP 17 to identify the reason for the external PMI. In reply, the SCP 17 returns the PMI byte. At block 298, the processor 11 checks the PMI byte to determine if the SCP is instructing it to terminate idle monitoring and/or exit idle mode as a result of the detection of system activity such as pressing of a key on one of the keyboards. If not, then at 299 the flowchart blocks associated with this condition are skipped. Otherwise, at block 301, the value COUNT is set to zero, the override timer is disabled and the SCP is advised that idle monitoring is being terminated. Then, at block 302, the processor 11 checks to see whether it is already in the idle mode and executing application programs at the idle speed. If not, then the exit from idle mode at block 303 is skipped. Otherwise, control proceeds to block 303, where the processor exits the idle mode by restoring to the saved state information the clock speeds which were saved at block 266 in FIG. 12, and by enabling the cache memory (if the cache memory was disabled at block 266). In either case, control proceeds to block 304 where the idle timer is restarted, and then to block 306.

At block 306, the processor 11 checks for a different possible reason for the PMI, in particular whether the SCP 17 has just detected a switch from DC power to AC power. Since power consumption is less critical in the AC mode, it is not necessary to operate in idle mode if the AC mode is in effect. Therefore, if it is determined at block 306 that the system has just been switched to AC power, control proceeds to block 307 where the main processor 11 disables the idle timer 42, override timer 41 and deturbo timer 212, and then advises the SCP that idle monitoring is being terminated. Then, in block 308, the processor 11 checks to see whether idle mode is in effect. If not, then the exit from idle mode at block 309 is skipped. Otherwise, control proceeds to block 309, where idle mode is exited in the same manner as in block 303.

If it is determined at block 306 that the system has not just changed from DC power to AC power, then control proceeds to block 311, where the processor checks the PMI byte to determine if the system has just been shifted from AC power to DC power. If so, then at block 312 the processor sets the variable COUNT to zero and enables the idle and deturbo timers 42 and 212 so that, in the event system activity terminates, the processor can enter deturbo mode or idle mode. If, on the other hand, it was determined at block 311 that the reason for the PMI was not a change from AC power to DC power, block 312 is skipped and the processor proceeds to look for other possible reasons for the PMI, which are not pertinent to the present invention and are therefore not illustrated and described.

FIGS. 15–17 represent respective routines executed by the SCP 17. FIG. 15 is a modified version of the clock interrupt handling routine shown in FIG. 8, and includes blocks 177 and 178 which are identical to the corresponding blocks in FIG. 8 and are identified with the same reference numerals. Two additional blocks 316 and 317 are shown, and will be described.

In this regard, in the embodiment of FIG. 10, the SCP 17 maintains a sliding window of data which indicates whether there have been any accesses to the video controller 21 during the preceding eight second period. The SCP determines whether there has been any video activity by monitoring the VIDEO signal which it receives from the logic circuit 214 (FIGS. 10 and 11). In particular, each time the clock interrupt occurs and the routine of FIG. 15 is entered, the SCP checks the VIDEO signal at 316 to see if it is actuated. If it is, then a video access has occurred. At block 317 the SCP updates its sliding window of information to indicate whether a video access has just occurred, and of course it simultaneously discards any prior information which is now more than eight seconds old. Then, it issues a pulse on its VIDCLR output in order to disable the AND gate 253 in FIG. 11 and thus unlatch the VIDEO signal.

FIG. 16 depicts a new interrupt routine which handles the system activity interrupt generated when the IOTRIG signal from the logic circuit 214 is actuated. This particular interrupt input of the SCP is not utilized in the embodiment of FIG. 1, and the embodiment of FIG. 1 thus does not have an interrupt handling routine comparable to the routine of FIG. 16. As previously described, the IOTRIG signal is actuated in response to various types of system activity other than accesses to the video controller 21. The occurrence of any such system activity means that the system should be operating at its normal operational speed rather than at the deturbo speed or idle speed. Consequently, FIG. 16 includes a block 319 in which the SCP updates the PMI byte to instruct the main processor to exit the idle mode and/or terminate idle monitoring, or in other words to return to the normal operational mode. Also in block 319, the SCP 17 outputs a pulse on its VIDCLR output in order to momentarily disable the AND gate 248 and thus clear the latched condition of the signal IOTRIG. Then, the SCP generates an external PMI to the main processor so that the main processor will initiate execution of the routine shown in FIG. 14 and return to normal operation in the manner already described in association with blocks 301–304 in FIG. 14.

FIG. 17 is a flowchart of a modified version of the command handler routine shown in FIG. 9, and is executed by the SCP when the main processor 11 sends a command to the SCP. At block 321, the SCP 17 accepts the command sent by the main processor, and then attempts to determine which command has been sent. In particular, at block 322, the SCP checks to see if it is being advised that the main processor 11 is initiating idle monitoring. If so, then at 323 the SCP sets the idle flag. While idle monitoring was disabled, the system activity interrupt driven by the IOTRIG signal from the logic circuit 214 has been disabled, and the SCP issues a pulse on its VIDCLR output which briefly disables the AND gate 248 and thus clears any latched condition of the IOTRIG signal that may have occurred while this signal was masked, and which also disables the AND gate 253 and thus clears any latched condition of the VIDEO signal. Then, still in block 323, the SCP enables its system activity interrupt, and then enters its low power mode. Then, control proceeds to block 324, where the SCP returns to the routine from which it was interrupted.

If it was determined at block 322 that the command is not an indication that the main processor 11 has started idle monitoring, then at block 326 the SCP checks to see if the command is advising it that the main processor is terminating idle monitoring. If so, then control proceeds to block 327, where the SCP clears the idle flag, disables the system activity interrupt, and exits its low power mode.

If it is determined at block 326 that the command does not indicate that idle monitoring is being terminated, then at block 328 the SCP checks to see whether the main processor is asking if there have been any video accesses during the past eight seconds. If so, then at block 329 the SCP checks its eight-second sliding window of information and advises the main processor of whether the window shows the occurrence of any video accesses in the past eight seconds.

If it is determined at block 328 that the command is not an inquiry regarding video accesses, then at block 331 the SCP checks to see if the command is asking it to identify the reason for generation by the SCP of an external PMI. If so, then at block 332 the SCP sends the PMI byte to the main processor 11.

OPERATION

The operation of the system pertinent to the present invention will now be briefly summarized. For purposes of this discussion, assume that the system is operating on DC power. When a user is actively typing on one of the keyboards or is using the mouse, and/or when an executing program is periodically updating the video display, interrupts IRQ1, IRQ11 and/or interrupt IRQ12 will be periodically generated and will cause the system event selector 36 to output a string of pulses on the SYSTEM EVENT line. The override timer will be disabled, but the idle timer 42 will be enabled and will be restarted by each pulse on the SYSTEM EVENT line, so that the idle timer does not reach expiration.

If this system activity ceases, then the idle timer will expire after 8 seconds, and the idle mode will be entered at blocks 118–119 and 121–122 of FIG. 3, which includes enabling the override timer 41 and shifting the processor 11 to its slowest clock speed. Control then returns to the interrupted application program. If there is no activity for another 8 seconds, then the idle timer will expire again and generate another PMI, which will lead to execution of blocks 127–129 in FIG. 3, where both timers are restarted and the count of idle timer expirations is incremented. Eventually, if system inactivity continues, the count of expirations of the idle timer will reach a value corresponding to the time interval at which an automatic entry to standby mode is to be effected. Therefore, at blocks 131–134 of FIG. 3, the system exits idle mode and then, provided the floppy disk and hard disk are not busy, enters standby mode at block 139. Standby includes stopping the clock of the processor 11 so that the processor 11 halts. The processor 11 remains in standby mode until the user generates input using a keyboard or the mouse, these events causing the break selector 38 to produce a BREAK EVENT signal which automatically restarts the clock of the processor 11 and causes it to exit standby mode at block 141, after which execution returns to the interrupted application program.

Assuming for sake of discussion that the processor 11 has entered and is currently carrying out program execution in idle mode, there are various events which can force the system out of the idle mode and back to its normal operational mode. For example, if the modem receives an incoming call while the system is in idle mode, the associated ring indicator signal MDMRI will produce a SYSTEM EVENT signal which resets the idle timer 42. Other not-illustrated events can have the same effect, but they are not themselves essential to an understanding of the present invention and are therefore not described in detail. Since each such event resets the idle timer 42, the timer 42 will not expire and generate a PMI, and therefore the override timer 41 will in due course expire and generate a PMI. Blocks 147–149 of FIG. 4 show how the system exits idle mode in response to expiration of the override timer. It should be noted that, from the point in time when a system event occurs and restarts the idle timer 42, several seconds may elapse before the override timer 41 expires and effects an exit from the idle mode in a manner shown in FIG. 4. This approach is acceptable for certain signals (such as the modem ring indicator signal) which are internal to the computer system and which actuate the SYSTEM EVENT line, but it is not acceptable for a user to have to wait several seconds after pressing a key or using the mouse in order to have the system run normally again. Therefore, if the SCP detects input from one of the keyboards or from the mouse, then as shown in FIGS. 6 and 7 it instructs the main processor to immediately exit the idle mode, and at blocks 153, 154 and 156 in FIG. 5 the system does exit idle.

As mentioned above, the processor 11 enters idle mode only if the system is operating on DC battery power. When the system is operating on AC power, entry to idle mode is not necessary because there is no critical need to save power. With this in mind, if the user supplies AC power to the system while the system is in idle mode, it is appropriate to immediately exit idle mode. In this regard, with reference to FIG. 8, when the SCP detects that a change has just occurred in the source of power, it notifies the main processor, and if the main processor determines at block 157 in FIG. 5 that the change is from DC power to AC power, and if the system is found to be in idle mode at block 158, then at blocks 159 and 161 the system exits the idle mode.

In the preferred embodiment described above, the preset register 44 is always loaded with a value representing a value of 8 seconds, regardless of whether the system is operating on AC or DC power. An alternative approach is to load the preset register with a value representing 8 seconds when the system is operating on DC power and to load it with a value representing the actual standby time interval when the system is operating on AC power. With reference to FIG. 5, block 161 would, just before restarting the idle timer 42, set the associated preset register 44 to the full standby time interval, because the system is commencing operation on AC power. The routine in FIG. 5 would also include a new block checking for a switch from AC power to DC power, and upon detection of this condition would load the preset register 44 with a value of 8 seconds and then restart the idle timer 42 for operation in DC power mode. In FIG. 3, an additional decision block would be added between blocks 116 and 117, and would check to see whether the system is currently operating on AC power. If so, then the initial expiration of timer 42 represents expiration of the full standby time interval, and control would proceed directly to block 136, whereas if it was determined that the system was operating on DC power, control would proceed to block 117. Blocks 132, 128 and 119 would be omitted. Under this approach, entry to and the various exits from the idle mode would, at a broad level, still occur in the same manner as for the first described embodiment and in response to the same conditions. This alternative approach is therefore mentioned only to make it clear that it is regarded to be a part of the present invention.

It must be emphasized that, as a practical matter, the standby mode is very visible to the user, because the display goes blank and, if the user presses a key, there is a brief delay until the display returns and the system continues operating. Thus, while the standby mode does provide a significant power saving in order to reduce the amount of electricity drawn from the battery, it can be annoying to a user. The idle mode according to the invention is intended to provide an intermediate level of power savings in response to system inactivity in a manner so that the user is entirely unaware that idle mode has been entered or exited.

Turning now to the embodiment of FIGS. 10–17, operation is slightly different from the embodiment of FIGS. 1–9, as follows. For purposes of this discussion, it will again be assumed that the system is operating on DC power. When a user is actively typing at the keyboard or using the mouse, or when the processor is accessing one or more of the hard disk, serial interface, parallel interface, network interface or numeric coprocessor, the logic circuit 214 (FIG. 10) will be outputting a string of pulses on the TRIGGERA line. The deturbo timer 212 will be restarted by each pulse on the TRIGGERA line, and will thus not expire. Similarly, this activity will cause the system events selector 36 to output a string of pulses on the SYSTEM EVENT line, each such pulse resetting the idle timer 42 so that the idle timer does not expire. If all of this system activity ceases, then after one-half second the deturbo timer 212 will expire and change the state of its output line 216, in response to which the speed control circuit 62 will cause the clock generator circuit 61 to slow the clock signals down to the deturbo speed. If this system inactivity continues for an additional seven and one-half seconds, or in other words a total of eight seconds, then the idle timer 42 will also expire, and the routine of FIG. 12 will be entered. Control will proceed through block 262 to block 263, where the main processor 11 increments the idle COUNT, restarts the idle timer, enables and starts the override timer, and asks the SCP whether there have been any video accesses during the past eight seconds. If there have not been any video accesses, then at block 266 the processor would enter the idle mode, which includes shifting the processor 11 to its slowest speed. However, for purposes of discussion, it will be assumed that it is determined at block 264 that there have been some video accesses despite the absence of other system activity, in which case block 266 is skipped. If there is no system activity for another eight seconds, the idle timer will expire again and the routine of FIG. 12 will again be entered, and control will proceed through blocks 262, 268 and 269 to block 271, where a further check is made to see if there have been video accesses during the past eight seconds despite the absence of other system activity. If not, and if it is determined at block 272 that the system is already in idle mode, then the system remains in idle mode. If it is determined at block 272 that the system is not in idle mode, then control proceeds to block 266 where the idle mode is entered. On the other hand, if it is determined at block 271 that there have been video accesses during the past eight seconds, then if the processor determines at block 273 that it is not already in the idle mode, block 274 is skipped and the processor remains out of the idle mode. Alternatively, if it is found at block 273 that the processor 11 is in the idle mode, the processor exits the idle mode at 274.

Thus, so long as there is no system activity other than possible video activity, the idle timer 42 expires every eight seconds and the value COUNT is updated to ultimately determine when the system should proceed from block 268 to block 276 to begin the entry to standby mode. Each time the idle timer expires after a period of eight seconds, the system checks to see whether there has been any video activity during that eight second interval. If there has not been any video activity, then the system enters idle mode and operates at the idle speed, whereas if there has been video activity then the system operates in deturbo mode at the deturbo speed. If there is intermittent video activity, the system can shift back and forth between the deturbo speed and idle speed. If any system activity other than video activity occurs during this time, the timing of the standby interval will immediately be terminated and the processor will be immediately shifted from the idle speed or deturbo speed back to its normal operational speed in a manner described below. On the other hand, if there is a continued absence of system activity other than possible video activity, it will ultimately be determined at block 268 that the standby interval has elapsed, and control will proceed to block 276 to prepare for entry to the standby mode.

At block 263, as the main processor 11 begins idle monitoring in association with its start of timing of the standby interval, the SCP 17 is advised that idle monitoring has commenced. The SCP 17, of course, continuously maintains the sliding eight-second window of information on video activity, and upon inquiry advises the main processor of whether there has been any video activity during the past eight seconds. When idle monitoring is in progress, the SCP will enable the interrupt input corresponding to the IOTRIG signal from the logic circuit 214. So long as there are no accesses to the hard disk 26, the serial interface 221, the parallel interface 223, the network interface 226 or the coprocessor 12, and so long as the user does not type on the keyboard or use the mouse, the logic circuit 214 will not actuate its IOTRIG signal and thus the processor 11 will continue timing the standby interval and can switch back and forth between deturbo speed and idle speed in dependence on whether or not video accesses have occurred within the past eight seconds.

However, if the user begins typing on a keyboard or moves the mouse, or if there is access to any one of the hard disk, serial interface, parallel interface, network interface or numeric coprocessor, the logic circuit 214 will generate the signal IOTRIG, which will interrupt the SCP 17 and cause it to execute the system activity handler routine of FIG. 16, in which it generates an external PMI to the main processor 11 for the purpose of advising the main processor 11 that there has been system activity and that the main processor should terminate idle monitoring and/or idle mode. The PMI will cause the main processor to enter the routine of FIG. 14 and execute block 301 in order to terminate idle monitoring and timing of the standby interval. If the processor 11 was operating in the idle mode and at the idle speed, the idle mode is exited at block 303. Since the signal TRIGGERA is generated substantially simultaneously with the signal IOTRIG by the logic circuit 214, the deturbo timer 212 will have already been restarted and will thus not be directing the system to operate at the deturbo speed. Consequently, the system will not be operating at idle speed or deturbo speed, and thus will necessarily return to execution of the application program at its normal operational speed.

It should be evident that, in the embodiment of FIG. 1, the SCP is responsive to keyboard or mouse activity for effecting an immediate exit from the idle mode, but the occurrence of other system activity will not effect an exit from the idle mode until the override timer 41 expires after a delay of about 4 seconds. In contrast, in the embodiment of FIG. 10, the IOTRIG signal from the logic circuit 214 is actuated by any such system activity (other than video accesses), and causes the SCP 17 to force the main processor 11 to immediately exit the idle mode and/or deturbo mode. Thus, in the embodiment of FIG. 10, events which effect an exit from the idle mode and/or deturbo mode should all effect an immediate exit, and there should be no events for which expiration of the override timer is necessary in order to effect the exit. The override timer could thus be omitted from the embodiment of FIG. 10. Nevertheless, it has been retained as a fail-safe feature, to ensure that the system will be forced to exit from the idle and/or deturbo modes in appropriate circumstances, for example where an additional circuit is connected at some future time to the bus 64 and produces signals which are taken into account by the system events selector 36 to reset the idle timer 42, but which are not taken into account by the logic circuit 214 implemented in the form of a custom integrated circuit chip.

Although a single preferred embodiment of the invention has been disclosed in detail for illustrative purposes, it will be recognized that there are variations or modifications which lie within the scope of the present invention.

The embodiments of the invention in which an exclusive property or privilege is claimed are defined as follows:

1. A computer system, comprising: a processor having first, second and third operational modes, said processor having means for carrying out program execution in each of said first, second, and third operational modes, and consuming less power in said second operational mode than in said first operational mode and less power in said third operational mode than in said second operational mode; first means responsive to the absence of a first predetermined event during a first predetermined time interval for automatically switching said processor from said first operational mode to said second operational mode; and second means responsive to the absence of both said first predetermined event and a second predetermined event different from said first predetermined event during a second predetermined time interval different from said first predetermined time interval for automatically switching said processor from said second operational mode to said third operational mode.

2. A system of claim 1, wherein said processor respectively operates at first, second and third clock speeds when respectively in said first, second and third operational modes, said second and third clock speeds being respectively less than said first and second clock speeds.

3. A system of claim 2, including timer means for timing said first predetermined time interval and responsive to the occurrence of said first predetermined event for restarting said timing of said first predetermined time interval, said timer means actuating an output signal thereof upon completion of timing of said first predetermined time interval, said processor including means for causing said processor to shift from execution at said first clock speed to execution at said second clock speed in response to actuation of said output signal from said timer means.

4. A system of claim 3, including first and second subsystems, said first subsystem being a subsystem other than a visual display and said second subsystem being a visual display, said first predetermined event being an access to said first subsystem and said second predetermined event being an access to said second subsystem.

5. A system of claim 4, wherein said first subsystem is one of a hard disk drive, a serial interface, a parallel interface, a network interface, a numeric coprocessor, a keyboard and a mouse.

6. A system of claim 1, including a further processor, said further processor including further means for monitoring said first and second predetermined events and for communicating to said main processor information regarding the occurrence and absence of each of said first and second predetermined events.

7. A system of claim 6, wherein said further means of said further processor includes means for maintaining and for communicating to said main processor information indicative of whether said first predetermined event has occurred during a time interval which is equal to said first predetermined time interval and which ends approximately at a point in time at which such information is provided to said main processor, and wherein said further processor has an interrupt input to which is applied a signal actuated in response to occurrence of said second predetermined event, said further means including interrupt handling means for maintaining and for communicating to said main processor information relating to actuation of said signal applied to said interrupt input.

8. A system of claim 1, including means responsive to the occurrence of said second predetermined event while said processor is operating in said third operational mode for automatically switching said processor from said third operational mode to said second operational mode.

9. A system of claim 1, including means responsive to the occurrence of either of said first and second predetermined events when said processor is operating in one of said second and third operational modes for automatically switching said processor to said first operational mode.

10. A system of claim 1, wherein said second predetermined time interval is longer than said first predetermined time interval.

11. A system of claim 1, wherein said first means includes means for effecting said switch to said second operational mode in a manner transparent to a user of said system, and wherein said second means includes means for effecting said switch to said third operational mode in a manner transparent to a user of said system.

12. A computer system, comprising: a main processor operable in a normal operational mode and in a reduced power mode, and first means responsive to the absence of a predetermined event during a predetermined time interval for automatically switching said main processor from said normal operational mode to said reduced power mode, said main processor carrying out program execution in each of said normal operational mode and said reduced power mode, wherein said first means includes a further processor coupled to said main processor and operable in a normal operational mode and in a reduced power mode, said further processor including second means for monitoring said predetermined event and advising said main processor of the occurrence of said predetermined event, said first means further including second means in said main processor responsive to the absence of an indication from said second means of an occurrence of said predetermined event during said predetermined time interval for switching said further processor from said normal operational mode to said reduced power mode and for effecting said switching of said main processor from said normal operational mode to said reduced power mode, and said further processor carrying out program execution in each of said normal operational mode and said reduced power mode.

13. A computer system, comprising: a processor operable in a normal operational mode and a reduced power mode, a display coupled to said processor, and mode control means responsive to the absence of a predetermined event other than communication between said processor and said display during a predetermined time interval for automatically switching said processor from said normal operational mode to said reduced power mode even if said processor communicated with said display during said predetermined time interval, said mode control means permitting said processor to thereafter operate in said reduced power mode in the absence of said predetermined event notwithstanding communication between said processor and said display, said processor carrying out program execution in each of said normal operational mode and said reduced power mode.

14. A system of claim 13, wherein said mode control means is responsive to an occurrence of said predetermined event when said processor is in said reduced power mode for switching said processor from said reduced power mode to said normal operational mode.

15. A system of claim 14, wherein said mode control means includes a hardware timer having a duration equal to said predetermined time interval and having an output coupled to a circuit of said processor which determines an operational mode of said processor, said processor being responsive to said timer output for respectively operating in said normal operational mode and said reduced power mode when said timer is respectively running and expired, said mode control means further including means for restarting said timer in response to each occurrence of said predetermined event.

16. A system of claim 13, wherein said processor has first and second clock speeds and consumes less power when operating at said second clock speed than when operating at said first clock speed, operation of said processor at said first and second clock speeds being operation respectively in said normal operational mode and said reduced power mode, and wherein said mode control means includes means for automatically switching said processor from operation at said first clock speed to operation at said second clock speed in order to effect said automatic switch from said normal operational mode to said reduced power mode.

17. A system of claim 16, wherein said predetermined time interval is approximately 0.5 second.

18. A system of claim 13, including means for generating an interrupt to said processor and including a disk drive coupled to said processor, said predetermined event being one of an occurrence of said interrupt and communication between said processor and said disk drive.

19. A system of claim 13, including a serial port circuit and a parallel port circuit each coupled to said processor, said predetermined event being an occurrence of communication between said processor and one of said serial port circuit and said parallel port circuit.

20. A system of claim 13, including a numeric coprocessor operationally coupled to said processor, said predetermined event being communication between said processor and said coprocessor.

21. A system of claim 13, including power supply means for supplying power to said system from a selected one of an internal power source and an external power source, said mode control means including means for maintaining said processor in said normal operational mode when said system is receiving power from said external power source and for permitting said automatic switching of said processor from said normal operational mode to said reduced power mode when said system is receiving power from said internal power source.

22. A computer system, comprising: a processor operable in a normal operational mode, in a reduced power mode in which said processor consumes less power than in said normal operational mode, and in a low power mode in which said processor consumes less power than in said reduced power mode, said processor carrying out program execution in each of said normal operational mode, said reduced power mode, and said low power mode; a display coupled to said processor; and mode control means responsive to the absence of a predetermined event other than communication between said processor and said display during a predetermined time interval when said processor is in said normal operational mode for automatically switching said processor from said normal operational mode to said reduced power mode even if said processor communicated with said display during said predetermined time interval, said mode control means permitting said processor to thereafter operate in said reduced power mode in the absence of said predetermined event notwithstanding communication between said processor and said display and being responsive to both the absence of said predetermined event and absence of communication between said processor and display during a predetermined time period longer than said predetermined time interval for automatically switching said processor to said low power mode.

23. A system of claim 22, wherein said processor has first, second, and third clock speeds, operation of said processor at said first, second, and third clock speeds respectively being operation in said normal operational mode, said reduced power mode, and said low power mode, and wherein said mode control means includes means for automatically switching said processor respectively to said second clock speed and said third clock speed to effect said switching respectively to said reduced power mode and said low power mode.

24. A system of claim 22, wherein said predetermined time interval is approximately 0.5 second, and said predetermined time period is approximately 8 seconds.

25. A system of claim 22, including power supply means for supplying power to said system from a selected one of an internal power source and an external power source, said mode control means including means for maintaining said processor in said normal operational mode when said system is receiving power from said external power source, and for permitting said automatic switching of said processor out of said normal operational mode when said system is receiving power from said internal power source.

26. A system of claim 22, wherein said mode control means includes further means responsive to the occurrence of communication between said processor and said display during operation in said low power mode in the absence of said predetermined event for switching said processor to said reduced power mode.

27. A system of claim 26, wherein said mode control means includes a processing unit which is coupled to said processor and which monitors communication between said processor and said display, said processor periodically making inquiry to said processing unit, and said processing unit including means for responding to each said inquiry by advising said processor as to whether there has been communication between said processor and said display during a monitoring interval equal to said predetermined time period and ending approximately at a point in time at which the inquiry is made, said further means being responsive to said processor being advised by said means in said processing unit that there has been an occurrence of communication between said processor and said display, when said processor is operating in said low power mode and in the absence of said predetermined event, for effecting said switching of said processor from said low power mode to said reduced power mode.

28. A system of claim 27, wherein said mode control means includes a hardware timer which times a predetermined time interval and which has an output coupled to an interrupt input of said processor so that expiration of said timer at the end of timing each said predetermined time interval effects an interrupt, said processor including means responsive to each said interrupt from said timer during operation in either of said reduced power mode and said low power mode for restarting said timer and for effecting said inquiry to said further processor as to whether there has been communication with said display.

29. A system of claim 28, wherein said mode control means includes means responsive to expiration of said timer a predetermined number of times following switching of said processor out of said normal operational mode for automatically switching said processor to a further operational mode in which said processor is halted and consumes less power than in said low power mode.

30. A system of claim 22, including a processing unit which is coupled to said processor, which operates in a normal mode when said processor is operating in either of said normal operational mode and said reduced power mode, and which operates in a low power mode when said processor is operating in said low power mode.

31. A system of claim 30, wherein said mode control means includes said processing unit having means for monitoring said predetermined event and, in response to an occurrence of said predetermined event during one of said reduced power mode and said low power mode, for notifying said processor to return to said normal operational mode.

32. A system of claim 31, wherein said mode control means includes a latch which is set in response to an occurrence of said predetermined event, said processing unit having means for selectively resetting said latch.

33. A system of claim 32, wherein said mode control means includes a further latch which is set in response to an occurrence of communication between said processor and said display, said processing unit having means for selectively resetting said further latch.

34. A system of claim 22, wherein said mode control means is responsive to the occurrence of a predetermined event when said processor is in either of said reduced power mode and said low power mode for switching said processor to said normal operational mode.

35. A system of claim 22, wherein said mode control means is responsive to the absence of said predetermined event for a further interval longer than said predetermined time period for switching said processor to a further operational mode regardless of whether there has been communication between said processor and display during said further interval, wherein in said further operational mode said processor is halted.

36. A system of claim 22, wherein said mode control means includes a first timer having a duration which is said predetermined time period and a second timer having a duration greater than said predetermined time period, including means for restarting said first timer in response to said predetermined event and for restarting each of said first and second timers in response to expiration of said first timer, and including means responsive to expiration of said second timer for switching said processor to said normal operational mode.

\* \* \* \* \*